US008926733B2

(12) United States Patent
Zheng et al.

(10) Patent No.: US 8,926,733 B2
(45) Date of Patent: Jan. 6, 2015

(54) POLYMERS, POLYMER MEMBRANES AND METHODS OF PRODUCING THE SAME

(75) Inventors: Shiying Zheng, Center Valley, PA (US);
Lloyd M. Robeson, Macungie, PA (US);
M. Keith Murphy, Clayton, MO (US);
Jeffrey R. Quay, Kutztown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 70 days.

(21) Appl. No.: 13/696,643

(22) PCT Filed: May 13, 2011

(86) PCT No.: PCT/US2011/036401
§ 371 (c)(1),
(2), (4) Date: Nov. 7, 2012

(87) PCT Pub. No.: WO2011/143530
PCT Pub. Date: Nov. 17, 2011

(65) Prior Publication Data
US 2013/0047844 A1  Feb. 28, 2013

Related U.S. Application Data

(60) Provisional application No. 61/334,258, filed on May 13, 2010.

(51) Int. Cl.
| | |
|---|---|
| B01D 53/22 | (2006.01) |
| B01D 67/00 | (2006.01) |
| B01D 71/64 | (2006.01) |
| C08L 79/08 | (2006.01) |
| C08J 9/00 | (2006.01) |
| C08L 77/00 | (2006.01) |
| C08L 79/04 | (2006.01) |

(52) U.S. Cl.
CPC .............. *B01D 67/003* (2013.01); *B01D 71/64* (2013.01); *C08L 77/00* (2013.01); *C08L 79/04* (2013.01); *C08L 79/08* (2013.01); *B01D 2323/18* (2013.01); *B01D 2323/24* (2013.01)
USPC ................ 95/45; 95/51; 95/52; 95/53; 95/54; 95/55; 96/4; 96/8; 96/11; 96/13; 521/77; 521/180

(58) Field of Classification Search
USPC ............ 95/45, 51, 52, 53, 54, 55; 96/4, 8, 10, 96/11, 13, 14; 521/77, 180; 264/41
See application file for complete search history.

(56) References Cited

U.S. PATENT DOCUMENTS

| | | | |
|---|---|---|---|
| 3,133,132 A | 5/1964 | Loeb et al. | |
| 4,517,142 A * | 5/1985 | Baniel ............................ | 264/41 |
| 4,728,345 A | 3/1988 | Murphy | |
| 5,085,676 A | 2/1992 | Ekiner et al. | |
| 5,104,532 A | 4/1992 | Thompson et al. | |
| 5,288,304 A | 2/1994 | Koros et al. | |
| 5,599,380 A | 2/1997 | Koros | |
| 2004/0177753 A1 * | 9/2004 | Chung et al. ....................... | 96/14 |
| 2007/0209506 A1 | 9/2007 | Liu et al. | |
| 2008/0017029 A1 * | 1/2008 | Kase et al. ....................... | 95/54 |
| 2009/0130419 A1 | 5/2009 | Takada et al. | |

FOREIGN PATENT DOCUMENTS

| | | | |
|---|---|---|---|
| CN | 1142410 A | 2/1997 | |
| GB | 1060546 | 3/1967 | |
| JP | 2000-508006 | 6/2000 | |
| JP | 2003236352 A2 | 8/2003 | |
| JP | 2004-267810 * | 9/2004 | ............. B01D 71/64 |
| JP | 2004267810 A2 | 9/2004 | |
| WO | 97/35905 | 10/1997 | |

OTHER PUBLICATIONS

Islam, Md. Nural et al., "Preparation and gas separation performance of flexible pyrolytic membranes by low-temperature pyrolysis of sulfonated polyimides", Journal of Membrane Science, vol. 261, 2005, pp. 17-26.*
Islam, Md. Nurul et al., "Preparation and gas separation performance of flexible pyrolytic membranes by low-temperature pyrolysis of sulfonated polyimides" Journal of Membrane Science 261 (2005) pp. 17-26.
Ozaki, J. et al., "Novel preparation method for the production of mesoporous carbon fiber from a polymer blend" Carbon vol. 35, No. 7, (1997) pp. 1031-1033.
Park, Ho Bum et al., "Polymers with Cavities Tuned for Fast Selective Transport of Small Molecules and Ions" Science, vol. 318, Oct. 12, 2007, pp. 254-258.
International Search Report and Written Opinion mailed Aug. 11, 2011 by the European Patent Office in its capacity as International Searching Authority for corresponding international patent application No. PCT/US2011/036401.
Robeson, Lloyd M. "Correlation of separation factor versus permeability for polymeric membranes" Journal of Membrane Science 62, (1991) pp. 165-185.

(Continued)

*Primary Examiner* — Jason M Greene
(74) *Attorney, Agent, or Firm* — Stradley Ronon Stevens & Young, LLP

(57) ABSTRACT

A method for preparing a polymeric material includes: providing a polymeric matrix having at least one polymer and at least one porogen; and degrading the at least one porogen at a temperature $T \leq 1.1\, T_g$, where $T_g$ is a glass transition temperature of the polymeric matrix. The degrading step includes exposing the polymeric matrix to thermal degradation, chemical degradation, electrical degradation and/or radiation degradation, wherein the polymeric material has a permeability at least 1.2 times a permeability of the polymeric matrix for a gas, and a selectivity of the polymeric material is at least 0.35 times a selectivity of the polymeric matrix for a gas pair. The method preferably provides gas separation membranes that exceed Robeson's upper bound relationship for at least one gas separation pair. Novel polymeric materials, gas separation membranes and fluid component separation methods are also described.

44 Claims, 4 Drawing Sheets

(56) References Cited

OTHER PUBLICATIONS

Freeman, Benny D. "Basis of Permeability/Selectivity Tradeoff Relations in Polymeric Gas Separation Memranes" Macromolecules 32, (1999) pp. 375-380.

Robeson, Lloyd, M. "The upper bound revisited" Journal of Membrane Science 320 (2008) pp. 390-400.

Zhou, Weiliang et al., "Gas Permation Properties of Flexible Pyrolytic Membranes from Sulfonated Polymides" Chemistry Letters (2002) pp. 534-535.

Gandini, Alessandro et al., "Reversible Click Chemistry at the Service of Macromolecular Materials. 2. Thermoreversible Polymers Based on the Diels-Alder Reaction of an A-B Furan/Maleimide Monomer" Journal of Polymer Science: Part A. Polymer Chemistry, vol. 48 (2010) pp. 2053-2056.

Zhou, Zheng-Hong, and Chen, Ry-Yu, "Synthesis of Glycerophospholipid Conjugates of Cantharidin and Its Analogues" Synthetic Communications 30(19) (2000) pp. 3527-3533.

Jegat, Corinne and Mignard, Nathalie, "Effect of the polymer matrix on the thermal behaviour of a furan-maleimide type adduct in the molten state" Polymer Bulletin 60, (2008) pp. 799-808.

Piroux et al "Gas Transport Properties of Sulfonated Copolyimides: Influence of Structural Parameters and Relative Humidity" Macromol. Symp. 188, 61-71 (2002).

Noshay and Robeson, "Sulfonated Polysulfone" Journal of Applied Polymer Science vol. 20, 1885-1903 (1976).

\* cited by examiner

POLYMERS, POLYMER MEMBRANES AND METHODS OF PRODUCING THE SAME

FIELD OF THE INVENTION

The present invention relates to the separation of a multi-component fluid mixture such as, for example, air, using polymer membranes. More particularly, the present invention relates to a method of preparing polymer membranes having an increase in free volume and a decrease in pore size distribution thus exhibiting advantageous permeability/selectivity properties relative to that typically achieved by prior art processes.

BACKGROUND

Polymer membranes have been utilized for various separations including gas separation as well as liquid separation. Membrane-based gas separation has become an important alternative to well-established separation operations, such as cryogenic distillation, and adsorption processes. Membrane-based gas separation is a pressure-driven process that does not require a high energy cost phase change of the feed gas mixture, as in other separation operations. Moreover, the mechanical simplicity and small footprint of membrane-based gas separation units provides a great deal of flexibility in installation and operation.

Such advantages have led to a wide range of applications for membrane-based gas separations. These separations include the gas pair (i.e., mixtures of at least two gases to be separated): $O_2/N_2$, $H_2/N_2$, $H_2/CH_4$, $CO_2/CH_4$, $H_2O/air$, He/air, $He/N_2$, $He/CH_4$, $He/H_2$, $He/CO_2$, $H_2/CO_2$, $H_2S$/natural gas and $H_2O$/natural gas. With increasing costs of energy and environmental concerns regarding $CO_2$ separation, collection and sequestration, gas membrane separation offers significant promise in present and emerging industries. One emerging environmental application could involve membrane $CO_2/N_2$ separation of flue gas to allow for $CO_2$ collection and sequestration.

The choice of a membrane material for gas separation applications is based on specific physical and chemical properties, since these materials should be tailored in an advanced way to separate particular gas mixtures. Commercial gas separation modules generally employ organic polymers as asymmetric non-porous membranes. The polymeric membrane materials are typically used in processes in which a feed gas mixture contacts the upstream side of the membrane, resulting in a permeate mixture on the downstream side of the membrane with a greater mole fraction of one of the components than the composition of the original feed gas mixture. A pressure differential is maintained between the upstream and downstream sides, providing the driving force for permeation. The downstream side can be maintained as a vacuum, or at any pressure below the upstream pressure.

The membrane performance is characterized by permeability and selectivity. Permeability (P) is the rate at which any gas component permeates through the membrane. The separation of a gas mixture is achieved by a membrane material that permits a faster permeation rate for one component (i.e., higher permeability) over that of another component. The efficiency of the membrane in enriching a component over another component in the permeate stream can be expressed as a quantity called selectivity. Selectivity (S) can be defined as the ratio of the permeabilities of the gas components across the membrane. The selectivity is a key parameter to achieve high product purity at high recoveries. A membrane's permeability and selectivity are material properties of the membrane material itself, and thus these properties are ideally constant with feed pressure, flow rate and other process conditions. However, permeability and selectivity are both temperature-dependent. It is desired to develop membrane materials with a high selectivity (efficiency) for the desired component, while maintaining a high permeability (productivity) for the desired component.

Typically, polymeric membranes show high selectivity and low permeability (throughput) when compared to porous materials, due to their low free volume. Polymer free volume, the fraction of the volume not occupied by the electronic clouds of the polymer, plays an important role in the transport properties of low molecular weight species and gases.

An amorphous polymer is in a rubbery state above its glass transition temperature ($T_g$). It presents a relatively large amount of free volume, owing to transient voids between the highly mobile polymer chains. When the temperature is lowered below its $T_g$, the polymer is in a glassy state, and behaves like a rigid glass: the fractional free volume decreases, resulting in insufficient space for large-scale co-operative movements of the polymer backbone.

Glassy polymers are differentiated from rubbery polymers by the rate of segmental movement of polymer chains. Polymers in the glassy state do not have the rapid molecular motion that permit rubbery polymers their liquid-like nature and their ability to adjust segmental configurations rapidly over larger than 0.5 nm distances. Glassy polymers exist in a non-equilibrium state with entangled molecular chains with immobile molecular backbones in frozen conformations. Generally, glassy polymers provide a selective environment for gas diffusion and are favored for gas separation applications. Rigid, glassy polymers are preferred as polymers with rigid polymer chain backbones that have limited intramolecular rotational mobility and are often characterized by having a high glass transition over 100 degrees C.

Almost all industrial gas separation membrane processes utilize glassy polymers because of high gas selectivity and good mechanical properties. In glassy polymers, the more permeable species are those with low molecular diameter and selectivity is due to differences in molecular dimension. The glassy state is characterized by a relatively small fraction of free volume. A larger amount of free volume (up to 20%) can be "frozen-in" by rapid cooling or by a rapid removal of a solvent in some polymers with stiff molecular structures. Free volume is locked into the structure as molecular mobility does not allow relaxation to fill the void space created with decreasing temperatures. The excess free volume is considered a non-equilibrium situation that is kinetically prevented from reaching an equilibrium condition due to the restriction of movement of polymer chains below the glass transition temperature. Medium to high free volume glassy polymers (e.g., polyimides, polyphenyleneoxides, poly(trimethylsilylpropyne), etc.) are used to produce membranes since the voids aid the transport of gas or liquid through the material.

In addition to the overall amount of free volume, polymer properties are also influenced by the distribution of micropores, particularly when the free volume elements are interconnected. Polymeric membranes generally undergo a trade-off limitation between permeability and selectivity: as selectivity increases, permeability decreases, and vice versa. Robeson showed in several references (L. M. Robeson, J. Membr. Sci. 62, 195 (1991); B. D. Freeman, Macromolecules 32, 375 (1999); L. M. Robeson, J. Membr. Sci. 320, 375 (2008)) that as for small gaseous molecules (e.g., $O_2$, $N_2$, $CO_2$, and $CH_4$) a superior limit or "upper bound" exists in a selectivity/permeability diagram. To achieve higher selectivity/permeability combinations, materials that do not obey those simple rules would be required.

A recent publication has noted that the upper bound can be exceeded with a polymer system that is thermally rearranged to promote main chain heterocyclic structures not present in the precursor polymer (Park et al., Science 318, 254 (2007)). It was noted that the pore size distribution in the thermally rearranged polymer is much narrower than in the precursor polymer, yielding molecular sieving like permeability/selectivity properties. Increasing free volume leads to increased permeability and decreasing the pore size distribution in polymers leads to increased selectivity. Methods to achieve both simultaneously are highly desired.

Creation of voids in polymer systems has been noted. Methods include selective decomposition of a thermally labile block from a block copolymer, or a thermally unstable component from a polymer blend, or an added porogen during polymerization. However, all of these methods produce porous polymers but with pore sizes well above the size desired for gas separation. Porogens yielding molecular scale dimensions are much less common.

Decomposition of pendant labile groups has been reported to increase free volume of polymers. Zhou et al. (Chem. Lett. 2002, 534) and Islam et al. (H, Mem. Sci. 2005, 261, 17) reported the thermal decomposition of pendant sulfonic acid groups of polyimide to increase free volume of the polymer membrane. The decomposition of sulfonic acid induced microvoids and led to increased free volume. Increased free volume enhanced gas permeability. The thermal decomposition was carried out at the temperatures higher than the glass transition temperatures of the polymers, which resulted in the relaxation of the polymer chains and the collapse of some of the microvoids created.

Despite the foregoing developments, there is still room in the membrane separation art for further improvements.

Thus, in the design of polymeric membranes for gas separation, it is desired to increase free volume by providing pore sizes having a narrower distribution than that typically achieved with solution casting or melt processing of polymers.

It is therefore desired to provide a polymer with increased free volume.

It is further desired to provide a method for producing a polymer with increased free volume.

It is still further desired to provide a gas separation membrane produced from a polymer with increased free volume.

It is still further desired to provide a process for producing a gas separation membrane produced from a polymer with increased free volume.

All references cited herein are incorporated herein in their entireties

SUMMARY OF THE INVENTION

Accordingly, a first aspect of the invention comprises a method for preparing a polymeric material, said method comprising:

providing a polymeric matrix comprising at least one polymer and at least one porogen; and degrading the at least one porogen at a temperature T less than or equal to $1.1 T_g$, where $T_g$ is a glass transition temperature of the polymeric matrix, said degrading step comprising exposing the polymeric matrix to at least one treatment selected from the group consisting of thermal degradation, chemical degradation, electrical degradation, and radiation degradation, wherein the polymeric material has a permeability at least 1.2 times a permeability of the polymeric matrix for a gas, and a selectivity of the polymeric material is at least 0.35 times a selectivity of the polymeric matrix for a gas pair.

A second aspect of the invention comprises a method for preparing a polymeric material, said method comprising:

providing a polymeric matrix comprising at least one polymer and at least one porogen; and degrading the at least one porogen at a temperature T less than or equal to $1.1 T_g$, where $T_g$ is a glass transition temperature of the polymeric matrix, said degrading step comprising exposing the polymeric matrix to at least one treatment selected from the group consisting of thermal degradation, chemical degradation, electrical degradation, and radiation degradation, wherein the polymeric material is a gas separation membrane, which exceeds Robeson's upper bound relationship for at least one gas separation pair selected from the group consisting of $O_2/N_2$, $CO_2/CH_4$, $CO_2/N_2$, $H_2/N_2$, $He/N_2$, $H_2/CH_4$, $He/CH_4$, $He/H_2$, $H_2/CO_2$ and $He/CO_2$.

A third aspect of the invention comprises a polymeric material prepared by a method of the invention, wherein the polymeric material is adapted for use as a gas separation membrane.

A fourth aspect of the invention comprises a gas separation membrane comprising a polymeric material of the invention.

A fifth aspect of the invention comprises a method for separating components of a fluid, said method comprising:

providing a separation device comprising a polymeric material of the invention as a separation membrane;

feeding a feed fluid to the separation device, wherein the feed fluid comprises a mixture of a first fluid and at least one second fluid; and collecting a product from the separation device, wherein the product contains the first fluid at a higher purity than the feed fluid.

BRIEF DESCRIPTION OF THE DRAWING(S)

FIG. 1 provides the thermal gravity analysis (TGA) of malonic acid.

FIG. 2 provides the thermal gravity analysis (TGA) of oxalic acid.

FIG. 3 provides the thermal gravity analysis (TGA) of control film after 100 degrees C. vacuum drying.

FIG. 4 provides the thermal gravity analysis (TGA) of control film after thermal cure at 250 degrees C. for 2 hours.

FIG. 5 provides the thermal gravity analysis (TGA) of film F1 after 100 degrees C. vacuum drying.

FIG. 6 provides the thermal gravity analysis (TGA) of film F1 after thermal cure at 250 degrees C. for 2 hours.

FIG. 7 provides the thermal gravity analysis (TGA) of film F3 after 100 degrees C. vacuum drying.

FIG. 8 provides the thermal gravity analysis (TGA) of film F3 after thermal cure at 250 degrees C. for 2 hours

DETAILED DESCRIPTION OF THE PREFERRED EMBODIMENT(S)

The invention was largely inspired by the discovery that polymers having one or more of the aforementioned desired characteristics can be provided by a process comprising the introduction of labile groups or miscible additives into a high glass transition rigid polymeric matrix followed by a degradation step to eliminate these groups or additives below the glass transition of the polymer mixture. The degradation step results in voids (molecular scale free volume) and non-equilibrium pore size distribution in the matrix. The expression "non-equilibrium pore size distribution" denotes that the distribution becomes unstable and reaches equilibrium as the temperature rises above the glass transition temperature of the polymer.

In the inventive process, at least one labile group is chemically bonded to, or ionically associated with, the polymer main chain and/or at least one miscible additive is added to the polymeric matrix. Thermal, chemical, electrical, and/or radiative processes are employed in a void formation step to degrade and eliminate the labile groups and/or miscible additives to form molecular scale voids (or pores). The pore-forming labile groups and additives are collectively referred to herein as porogens.

In preferred embodiments, the polymeric substrate on which the void formation step is conducted is a membrane. The resultant membrane (e.g., hollow fiber or flat sheet) is subsequently fabricated into the appropriate modules for gas separation applications.

Providing improved gas separation membranes exhibiting performance equal to or above an upper bound (i.e., at least one of the upper bounds defined in Robeson 2008, above) requires the glassy polymers of the membranes to exhibit a pore size distribution that is narrow relative to that typically attained by solution processing of the glassy polymers by normal membrane fabrication techniques. The thermal rearrangement process taught by Park et al., Science 318, 254 (2007), has been demonstrated to achieve a pore size distribution narrower than the original membrane such that performance improvements can be achieved approaching molecular sieving like separation characteristics. It is believed by Park et al. that the thermal rearrangement process, not the removal of volatile gas $CO_2$, leads to a pore size distribution narrower than the original membrane. It is desirable to increase the permeability of membranes as well as to achieve high selectivity. Increasing the free volume of a glassy polymer leads to higher permeability. Non-equilibrium pore size distribution is not recognized in the patent or published literature as a methodology to achieve improved selectivity.

The inventive process provides increased permeability and selectivity of the membrane by subjecting a glassy polymer membrane to thermal, chemical, electrical, or radiation exposure to remove labile groups or miscible additives to create free volume. In certain embodiments, the permeability of polymeric materials treated by the method of the invention is at least 1.2 or 5 or 50 or 100 times the permeability of the untreated polymeric materials for a given gas, and the selectivity of the treated polymeric material is at least 0.35 or 0.5 or 0.75 times the selectivity of the untreated polymeric material for a gas pair including the given gas.

This process is conducted below, at or slightly above the glass transition of the polymer in a time frame such that equilibrium re-distribution of the resultant pore size distribution does not occur and the void created does not appreciably collapse. The process enables the formation and retention of both a higher free volume and a non-equilibrium pore size distribution to optimize both permeability and selectivity.

Glassy polymers useful for the present invention include but are not limited to polysulfones; poly(styrenes), including styrene-containing copolymers, such as acrylonitrile-styrene copolymers, styrene-butadiene copolymers and styrene-vinylbenzyl halide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides, and aryl polyimides; polyamideimides; polyethers; polyetherimides; polyetherketones; polyethersulfones; poly(arylene oxides), such as poly(phenylene oxide) and poly(xylene oxide); poly(esteramide-diisocyanate); polyurethanes; polyesters (including polyarylates), such as polyethylene terephthalate, poly(alkyl methacrylates), poly(acrylates), poly(phenylene terephthalate), etc.; polypyrrolones; polysulfides; polymers from monomers having alpha-olefinic unsaturation other than mentioned above, such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters), such as poly(vinyl acetate) and poly(vinyl propionate), poly(vinyl pyridines), poly(vinyl pyrrolidones), poly(vinyl ethers), poly(vinyl ketones), poly(vinyl aldehydes), such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; pol(benzoxazoles); poly(benzthiazoles); poly(benzimidazole); polycarbodiimides; poly(phenyl quinoxaline), poly(amide-imides), poly(oxadiazole-imides), polyphosphazenes, and polyphosphazines; polyurethanes, polyureas, poly(trialkylsilylacetylenes), and blends thereof. Typical substituents providing substituted polymers include halogens, such as fluorine, chlorine and bromine; hydroxyl groups; lower alkyl groups; lower alkoxy groups; monocyclic aryl; lower acyl groups and the like.

The glassy polymers of the present invention can be prepared by, e.g., free radical, cationic or anionic polymerization of vinyl compounds, ring-opening polymerization of cyclic compounds, ring-opening metathesis polymerization, or condensation polymerizations. Condensation polymerization includes but is not limited to coupling reactions, such as Pd-catalyzed Suzuki coupling, Stille coupling or Heck coupling, or Ni-mediated Yamamoto coupling, condensation reaction of di-(acid chlorides) and diamines or di-acid and diamine to synthesize polyamide, di-(acid chlorides) and di-alcohols or di-phenols to synthesize polyester, diamine and dianhydride to synthesize polyimide, and other condensation methods, such as Wittig reaction, or Horner-Emmons reaction, or Knoevenagel reaction. The glassy polymer can also be synthesized by polymerization of diisocyanates with di-alcohol or polyol to produce polyurethane, or diisocyanates with diamine or polyamine to produce polyurea. Preferably, polymers are prepared by condensation polymerization.

The glassy polymers useful for the present invention include homopolymer, random and block copolymer; linear, and branched polymers. Branched polymers include graft polymers, star polymers, dendrimers, and hyperbranched polymers. Polymer blends can also be used in the present invention.

Preferred polymers suitable for the membrane of the present invention include polyimides, poyletherimides, polyethersulfones, polysulfones, polybenzimidazoles, polybenzobenzimidazoles, poly(aryl ether ketones), poly(aryl ethers), aromatic polyarylates, aromatic polycarbonates, poly(benzoxazoles), poly(amide-imides), poly(oxadiazole-imides), poly(etherimides), poly(aryl sulfides), polybenzothiazoles, polypyrrolones, polyoxadiazoles, polytriazoles, polyesterimides, poly(phenyl quinoxaline), poly(phenylenes), and copolymers and blends thereof. More preferred polymers useable in the membrane material of present invention include polyimides, polyamides, poyletherimides, and polysulfones. Certain embodiments are polyimide-free, while certain other embodiments comprise polyimides wherein the porogen is not carboxylic acid or sulfonic acid. In still other embodiments, the porogen is a carboxylic acid and the film comprises a polyimide.

The choice of the polymer is dependent upon the method used to eliminate the labile groups or additives. As an example, aromatic polycarbonates and polyarylates will be less viable for thermal methods than many of the other polymers and would not be adequate for hydrolysis elimination but could be considered for radiation methods. A preferred embodiment comprises glassy polymers containing pendant labile groups that are degraded by thermal, chemical, electrical or radiative exposure yielding products that are capable of diffusing out of the glassy polymer. Since only pendant labile groups are degraded, polymer backbone structure is not changed, thus maintaining mechanical properties of membrane.

Another preferred embodiment comprises glassy polymers containing labile groups as part of the polymer main chain and the labile groups are removed by thermal, chemical, electrical, or radiative exposure without changing the polymer backbone. The degradation of labile groups yields products that are capable of diffusing out of the glassy polymer. The glassy polymers of the two preferred embodiments are respectively represented by the following structures I and II:

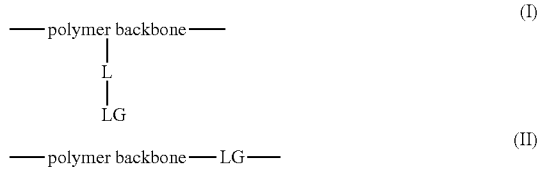

wherein:
LG is a labile group that can be degraded by thermal, chemical, electrical or radiative exposure yielding products that are capable of diffusing out of the glassy polymer; and L is a direct bond between LG and polymer backbone or a carbon linking group having 1 to 40 carbon atoms or a non-carbon linking group having 0 to 40 carbon atoms. When L is a linking group, it includes alkyl, alkenyl, alkynyl, aryl, or heteroaryl; L may also contain at least one of O, N, S, F, Cl, Br and Si atoms.

Suitable labile groups include, but are not limited to, aliphatic hydrocarbon groups (such as tertiary butyl group and vinylic groups) including aliphatic halogenated hydrocarbon groups and cycloaliphatic groups; ester and thioester groups including aliphatic and aromatic ester and thioester groups; aliphatic ether groups, such as propylene oxide, poly(ethylene oxide) oligomer, poly(propylene oxide) oligomers, and thioether groups; Diels-Alder adducts; aliphatic carbonate groups; halogen groups; aliphatic and aromatic sulfonate; aliphatic and aromatic phosphonates; bisulfide groups; azo groups; blocked isocyanate group; carboxylate; organoonium including phosphonium sulfonium, quaternized ammonium; N-alkylated heteroaryl groups; and thiosulfate; and mixtures of two or more of the foregoing.

Non-exhaustive examples of LG are shown in the following groups:

a) Group I: aliphatic hydrocarbon groups

—R wherein R is a branched or unbranched, substituted or unsubstituted alkyl group having 1 to 20 carbon atoms, alkenyl or alkynyl group having 2 to 20 carbon atoms, cycloalkyl group having 3 to 20 carbon atoms. Examples include but are not limited to cyclopentyl, cyclohexyl and 4-methylcyclohexyl, methyl, ethyl, n-propyl, isopropyl, t-butyl, hexyl, methoxymethyl, benzyl, neopentyl, dodecyl, and vinyl. In certain embodiments, R can also contain at least one of O, Si, N, F, Cl, and Br atoms. Preferably, R is a substituted or unsubstituted, branched or unbranched alkyl group having from 1 to 12 carbon atoms, and most preferably, R is a tert-butyl group.

b) Group II: ester and thioester groups

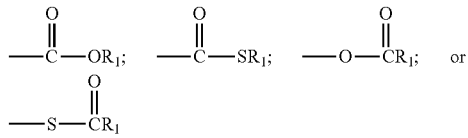

wherein $R_1$ is a substituted or unsubstituted alkyl group having 1 to 20 carbon atoms, alkenyl or alkynyl group having 2 to 20 carbon atoms, cycloalkyl group having 3 to 20 carbon atoms, a substituted or unsubstituted aryl group having 6 to 20 carbon atoms (such as phenyl, naphthyl, anthryl, p-methoxyphenyl, xylyl, and alkoxycarbonylphenyl), a halo group (such as chloro and bromo), a substituted or unsubstituted cycloalkyl group having 5 to 8 carbon atoms (such as cyclopentyl, cyclohexyl and 4-methylcyclohexyl), or a substituted or unsubstituted heterocyclic group having 5 to 20 atoms including at least one nitrogen, sulfur or oxygen atom in the ring (such as pyridyl, pyridinyl, tetrahydrofuranyl and tetrahydropyranyl). $R_1$ may also contain O, Si, N, F, Cl, or Br atoms. Preferably, $R_1$ is a substituted or unsubstituted methyl, ethyl, isopropyl, or t-butyl group.

c) Group III: ether or thioether groups

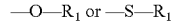

wherein $R_1$ is defined as above. Preferably, $R_1$ is a substituted or unsubstituted methyl, ethyl, isopropyl, t-butyl group, ethylene oxide, propylene oxide, poly(ethylene oxide) oliogmer, or poly(propylene oxide) oligomer.

d) Group IV: carbonate groups

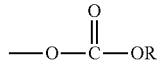

wherein R is defined as above e) Group V: halogen groups

wherein X is a F, Cl, Br, or I atom.

f) Group VI: sulfonate groups

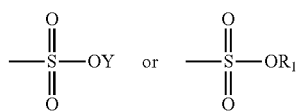

wherein Y is hydrogen, ammonium ion, or a metal ion (such as, e.g., sodium, potassium, magnesium, calcium, cesium, barium, zinc, or lithium ion). Preferably, Y is hydrogen, sodium ion, or potassium ion. $R_1$ is defined as above.

g) Group VII: phosphonate groups

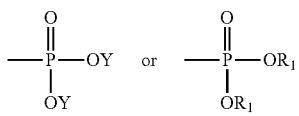

wherein Y and $R_1$ are defined as above.

h) Group VIII: azo groups

wherein $R_1$ is defined as above.

i) Group IX: blocked isocyanate groups

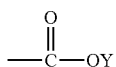

wherein Y is hydrogen or a cation, such as, e.g., quaternized ammonium.

k) Group XI: N-alkylated heteroaromatic groups

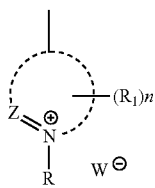

wherein:

Z represents the carbon and any additional nitrogen, oxygen, or sulfur atoms necessary to complete the 5- to 10-membered (preferably 5- to 6-membered) N-heteroaromatic ring. The ring can include two or more nitrogen atoms in the ring (for example, N-alkylated diazinium or imidazolium groups), or N-alkylated nitrogen-containing fused ring systems including, but not limited to, pyridinium, quinolinium, isoquinolinium, acridinium, phenanthradinium and others readily apparent to one skilled in the art. Preferably, the N-alkylated nitrogen containing aromatic group is imidazolium or pyridinium.

W is an anion. Suitable anions include but are not limited to the halides, carboxylates, sulfates, borates and sulfonates. Representative anions include, but are not limited to, chloride, bromide, fluoride, acetate, tetrafluoroborate, formate, sulfate, p-toluenesulfonate and others readily apparent to one skilled in the art. Preferred anions are halides and carboxylates. Most preferably, W is acetate or chloride.

n is an integer from 0 to 6, and is preferably 0 or 1. Most preferably, n is 0.

l) Group XII: thiosulfate groups

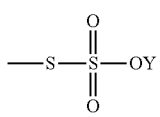

wherein Y is as defined for Group VI above.

m) Group XIII: organoonium groups

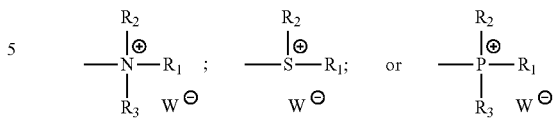

wherein $R_1$, $R_2$ and $R_3$ are defined as $R_1$ is defined above. $R_1$, $R_2$ and $R_3$ are independently the same or different. Any two of $R_1$, $R_2$ and $R_3$ can be combined to form a substituted or unsubstituted heterocyclic ring with the charged phosphorus, sulfur or nitrogen atom, the ring having 4 to 8 carbon, nitrogen, phosphorus, sulfur or oxygen atoms in the ring. Such heterocyclic rings include, but are not limited to, substituted or unsubstituted morpholinium, piperidinium, and pyrrolidinium groups or quaternized ammonium group.

n) Group XIV: bisulfide groups

wherein $R_1$ is defined as above.

o) Group XV: Diels-Alder adducts

wherein D-A are defined as Diels-Alder adducts formed between a diene and a dienophile and are capable of Retro-Diels-Alder reaction.

Labile groups (LG) can be incorporated into the glassy polymers by, e.g., polymerizing monomers containing labile groups or by modifying the appropriate polymers to incorporate the labile groups. Non-limiting examples of labile groups as pendant side chain to the polymer chain include the following. Cyclic structures, such as crown ethers or calixarenes covalently bonded as side groups, would comprise additional labile groups of interest. A pendant azo linking group (—N=N—) is a potential labile moiety that can be covalently bonded to the polymer matrix and have end termination of alkyl or aryl substituents. Alkyl azo compounds are known to be thermally labile releasing $N_2$ upon thermal or radiation exposure. A tertiary butyl group or pendant oligomeric poly(propylene oxide) side chain to polyimide or polyamide could likewise be thermally removed without main chain molecular weight reduction. The pendant group, such as carboxylic acid and carboxylic acid esters will be eliminated to gaseous species (such as $CO_2$) with the capability of diffusing out of the polymer matrix. A specific example includes the aromatic tert-butyl ester. Thermal or acid hydrolysis could remove the tertiary butyl group, leaving an attached aromatic carboxylic acid which could likewise be eliminated at high temperature. For the aromatic ester, the resultant size of the void depends upon the size (molecular weight) of the alkyl or aromatic group substituted for hydrogen in the carboxylic acid precursor.

The pendant groups noted above are preferably attached to the aromatic or heterocyclic monomer employed in the polymerization of the desired high glass transition temperature polymer matrix. Examples of these monomers include but are not limited to aromatic diamines, bisphenols, aromatic dicarboxylic acids, and aromatic dianhydrides with the desired labile pendant groups. Specific non-limiting examples of monomers include 1,4-diaminoanthraquinone, 2,5-diisopropyl-1,4-phenylene diamine, 2,5-dicyclohexy-1,4-phenylene diamine, 2,5-di-tertbutyl-1,4-phenylene diamine, 5-tert-butyl isophthalic acid; 4,4'-methylene-bis(2,6-ditertbutyl phenol), 4,4'-sulfonyl bis(2-tertbutyl phenol), tertbutyl hydroquinone, 2,3-dichloro-5,7-dihydroxy-1,4-naphthoquinone, 3,5'-dihydroxyacetophenone, 2-nitro resorcinol, 3,5-diamino-tert-butyl benzene, 2,4-diamino-benzenesulfonic acid, and 3,5-diamino-benzylalcohol.

Another method to incorporate labile groups into the glassy polymer of the present invention is to modify the appropriate polymer to attach the desired groups. For example, a polyimide with pendant aromatic hydroxyls could be reacted with carboxylic acid, carboxylic acid anhydride, or acid chlorides to yield pendant ester groups capable of thermal or chemical removal. Or the desired groups can be attached to glassy polymer by grafting onto polymer backbone.

Another aspect of the present invention comprises the incorporation of additives into the polymer matrix whereby the added species is miscible (forms a homogeneous mixture with the polymer matrix) and upon thermal, chemical, electrical, or radiative exposure are degraded to form species that are capable of diffusing out of the polymer matrix. This process is conducted at a temperature below, at or near the glass transition of the polymer matrix so as to avoid the relaxation process, which would otherwise occur at temperatures above the glass transition temperature and result in collapse of the free volume that is created.

The additives of the present invention are broadly defined as any miscible species with the capability of degradation to yield products which are capable of diffusing out of the polymer matrix. The additives can incorporate any of the labile groups (LG) defined above. The additives include any small molecules, oligomers and polymers miscible with polymer matrix.

Examples of additives include but are not limited to aliphatic hydrocarbons; aliphatic carboxylic acids and esters such as malonic acid, oxalic acid and itaconic acid; aliphatic ethers and thioethers; aliphatic carbonates; aromatic carboxylic acids and esters and carbonates, such as benzoic acid, tert-butylbenzoate, diphenyl carbonates, diphenyl esters and oligomeric structures thereof; crown ethers, such as 12-crown-4,18-crown-6, dibenzo-18-crown-6 and diaza-18-crown-6; calixarenes, such as calix(4)arene with para-tertiary-butyl groups, cyclic structures of aromatic linked groups with labile linking groups, such as the cyclic trimer of bisphenols linked with ester groups and the cyclic structures of conventional polyesters, such as poly(butylene terephthalate); blocked isocyanate; Diels-Alder adducts; organoonium compounds such as morpholinium, piperidinium, and pyrrolidinium and quaternized ammonium compounds; and azo compounds. Aliphatic or aromatic azo compounds provide a labile linkage that degrades to release nitrogen. Specific examples include azo dyes, such as yellow azo dye and aliphatic azo compounds, such as azobisisobutyronitrile and similar compounds. Chemical blowing agents are added to polymers to create foam structures during melt processing. These agents can contain carbonate groups to liberate $CO_2$ and/or azo groups to generate $N_2$ during decomposition. One example is azodicarbonamide. While they will foam polymers in the melt state, addition to glassy polymers will create molecular size voids during degradation as desired in the present invention. Additional commercially available blowing agents include oxybis-benzene sulfonyl hydrazide, toluene sulfonyl hydrazide and toluene sulfonyl semi-carbazide. Photo acid generators typically employed in photoresist applications, which degrade to form acidic residues upon exposure to UV radiation, are also useful for the present invention.

Other labile additives include sulfur (preferably $S_8$ offering a cyclic structure) that is capable of being removed by oxidation. Disulfide linked organic molecules (aliphatic or aromatic groups) can be degraded thermally or chemically to yield structures capable of diffusing out of a glassy polymer matrix. Other sulfur containing compounds include organic sulfonic acid and sulfonate, sulfates and sulfites, bisulfide compounds, alphatic and aromatic thiosulfates. Labile natural products, such as alpha-terpinene, d-limonene, rosin and abietic acid esters and the like are also useful for the present invention.

Another aspect of the present invention comprises providing a blend of a labile miscible polymer with a high glass transition polymer matrix, and subjecting the blend to conditions whereby the labile polymer is liberated below, at or near the glass transition temperature of the polymer matrix.

In yet another aspect, the present invention comprises providing a blend of more than one high glass transition polymer matrix with at least one labile additive, and subjecting the mixture to conditions whereby the labile additive is eliminated below, at or near the glass transition temperature of the polymer matrix.

In yet another aspect, the present invention comprises providing a blend of more than one high glass transition polymer matrix with at least one labile miscible polymer, and subjecting the mixture to conditions whereby the labile polymer is eliminated below, at or near the glass transition temperature of the polymer matrix.

The advantages of incorporation of additives into the polymer matrix include a wide range choice of polymer matrix and additives as well as the ease of preparing the blend of polymer matrix and additive(s).

The additive(s) and polymer matrix can be dissolved in the same solvent or miscible solvents to prepare a homogeneous solution. The amount of additive relative to the polymer matrix can be varied depending on chemical structures of the additive and polymer matrix, and the process utilized to degrade the labile additive(s). The amount of the additive to polymer matrix can be from about 1 to about 40 weight percent, or from about 2 to about 35 weight percent, or from about 3 to about 30 weight percent, or from about 4 to about 25 weight percent provided that the mixture forms a homogenous solution and no macrophase separation in the resulting film or membrane.

The labile additives to the polymer matrix of the present invention can be degraded by thermal, chemical, electrical or radiative exposure to form species that are capable of diffusing out of the polymer matrix. When degradation proceeds via thermal exposure, it is necessary to select the type and the amount of the labile additive such that the specific structure and composition does not critically reduce the glass transition temperature of the mixture with the high glass transition temperature matrix polymer to a temperature whereby an appreciable amount of void formation relaxation occurs. Radiation (such as UV exposure), electrical, and chemical reactions to promote degradation of the labile additives offer the potential advantages of being conducted at lower temperatures than the thermal process.

The glassy polymers of the present invention offer glass transition temperatures sufficiently high to provide reduced relaxation of the free volume in the range of the $T_g$ and lower. Thus, processing temperatures (T) can be less than or equal to $T_g$, or even slightly higher (e.g., up to 1.1 $T_g$ or 10% above $T_g$).

High glass transition temperature is defined herein as a glass transition temperature higher than 100 degrees C., or preferably higher than 150 degrees C., or more preferably higher than 200 degrees C.

In certain embodiments of the invention, the polymer matrix is crosslinked prior to the degradation step, so as to reduce the relaxation process for the polymer and help prevent free volume loss.

In certain embodiments of the invention, crosslinkable moieties are generated when degrading and eliminating the porogens.

In certain embodiments, polyimides are used as polymers for membrane production. Polyimides, in general, have high glass transition temperatures, good thermo-mechanical properties and good gas permeability. The polyimides comprise repeating units of general formula (III):

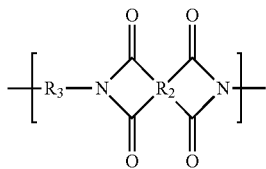

(III)

wherein $R_2$ is a tetravalent organic radical having 4 to 40 carbon atoms, and $R_3$ is a divalent organic radical having 2 to 40 carbon atoms.

Another embodiment of the present invention comprises the use of polyamides as polymers for membrane production comprising repeating units of general formula (IV):

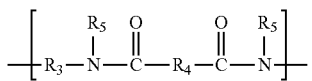

(IV)

wherein $R_3$ and $R_4$ are divalent organic radicals having 2 to 40 carbon atoms; $R_3$ and $R_4$ are independently the same or different; and $R_5$ is hydrogen, phenyl, or alkyl group of 1 to 6 carbon atoms.

Another embodiment of the present invention comprises the use of polysulfones and polyethersulfones as polymers for membrane production. Polysulfones and polyethersulfones have high resistance to acids, alkalis, oils, greases, aliphatic hydrocarbons, and alcohols, even at elevated temperatures under moderate stress. These polymers are excellent membrane materials. Polysulfones comprise repeating units of general formulas (V) and (VI), and polyethersulfones comprise repeating units of general formula (VII):

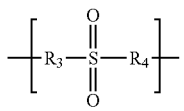

(V)

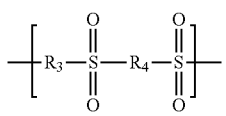

(VI)

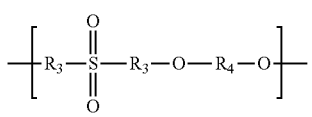

(VII)

In formulas III-VII, the divalent radicals $R_3$, and $R_4$ may be substituted or unsubstituted phenylene, naphthylene, biphenylene, anthrylene, or two phenyl groups connected by a linking group $R_6$ as shown in the following structure

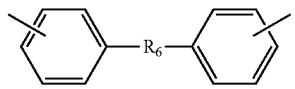

wherein $R_6$ is alkylene (including alkylidene) of 1 to 18 carbon atoms, aralkylene of 6 to 18 carbon atoms, haloalkylene (including haloalkylidene) of 1 to 18 carbon atoms in which the halogen(s) are fluorine, chlorine, bromine or iodine, oxygen, sulfur, ester group, amide group, —$SO_2$—, —CO—, —P(O)—, —O—P(O)$R_7$—O— in which $R_7$ is an alkyl of 1 to 6 carbon atoms or phenyl, amino group, silicon group, siloxane group, urea group, carbonate group. Preferred embodiments of $R_6$ are alkylidene and haloalkylidene of 1 to 3 carbon atoms, aralkylidene, oxy, —$SO_2$—, and —CO—.

The tetravalent radical $R_2$ (of Formula III above) can be a substituted or unsubstituted phenyl, biphenyl, naphthyl, anthryl, thiophenyl, pyridyl, pyrazyl, and two phenyl groups connected by linking a group $R_6$.

Substituents on the above divalent radicals $R_3$ and $R_4$, and tetravalent radical $R_2$, i.e., replacements for hydrogen in aromatic C—H groups, include alkyl of 1 to 18 carbon atoms, such as methyl, ethyl, isopropyl, butyl, tert.-butyl, hexyl, and octadecyl, phenyl, halogen, such as fluorine, chlorine, bromine and iodine, lower alkoxy, carboxyl, alkoxycarbonyl of 1 to 6 carbon atoms, carbacyl of 1 to 6 carbon atoms, such as acetyl and hexanoyl, sulfo and sulfo salt of an alkali or alkaline earth metal.

Polyimides can be produced by, e.g., reacting a dianhydride component with a diamine component at a pre-determined ratio in a polar solvent whereby a polyamic acid is formed first, followed by dehydration and ring closure to form polyimide.

Specific examples of dianhydrides suitable for the production of polyimides of the present invention include but are not limited to the following:
3,4,3',4'-Diphenyldi(trifluoromethyl)methanetetracarboxylic dianhydride (6FDA),
3,4,3',4'-Diphenyldimethylmethanetetracarboxylic dianhydride,
Pyromellitic dianhydride,
3,4,3',4'-Diphenylsulfonetetracarboxylic dianhydride,
3,4,3',4'-Benzophenonetetracarboxylic dianhydride,
Pyrazinetetracarboxylic dianhydride,
2,3,6,7-Naphthalenetetracarboxylic dianhydride,
3,4,3',4'-Diphenyltetracarboxylic dianhydride,
3,4,3',4'-Diphenylmethanetetracarboxylic dianhydride,
2,3,3',4'-Diphenyltetracarboxylic dianhydride,
2,2',3,3'-biphenyltetracarboxylic dianhydride,
3,4,9,10-Perylenetetracarboxylic dianhydride,
3,4,3',4'-Diphenylethertetracarboxylic dianhydride,
1,2,4,5-Naphthalenetetracarboxylic dianhydride,
1,4,5,8-Naphthalenetetracarboxylic dianhydride,
1,8,9,10-Phenanthrenetetracarboxylic dianhydride,
2,3,4,5-Thiophenetetracarboxylic dianhydride,
2,3,6,7-anthracenetetracarboxylic dianhydride,
3,4,3',4'-diphenyldimethylsilane tetracarboxylic dianhydride,
Diphenyl-3,4,3',4'-diphenylsilane tetracarboxylic dianhydride, Phenyl-3,4,3',4'-diphenyl amine tetracarboxylic dianhydride, 3,4,3',4'-diphenyl methylamine tetracarboxylic dianhydride, 2,3,6,7-(9,9-dialkyl)fluorene tetracarboxylic dianhydride, 2,3,6,7-(9,9-diphenyl)fluorene tetracarboxylic dianhydride, 1,9,5,10-anthracenetetracarboxylic dianhydride, and Pyridinetetracarboxylic dianhydride.

Specific examples of diamines that suitable for the production of polyimides of the present invention include but are not limited to the following:

4,4'-Diaminodiphenyl ether, 4,4'-Diaminodiphenyl sulfone, 4,4'-Diaminodiphenyl-bis-(trifluoromethyl)methane, 1,3-Phenylenediamine, 1,4-Phenylenediamine, 4,4'-Diaminodiphenyl propane, 2,4-Diaminotoluene, 4,4'-Diaminodiphenyl methane.

3,3'-dimethyl-4,4'-diaminodiphenylmethane, 3,3',5,5'-tetramethyl-4,4'-diaminodiphenylmethane, 3,3',5,5'-tetramethyl-4,4'-diaminodiphenylmethane, 4,4'-Diaminodiphenyl sulfide, 2,6-Diaminopyridine, Bis(4-aminophenyl)-diethylsilane, Bis(4-aminophenyl)-diphenylsilane, Benzidine, 3,3'-dihydroxybenzidine, 3,3'-diaminobenzidine, 3,3'-Dimethoxybenzidine, Bis(4-aminophenyl)-ethylphosphine oxide, Bis(4-aminophenyl)-butylamine, Bis(4-aminophenyl)-methylamine, 1,5-Diaminonaphthalene, 3,3'-Dimethyl-4,4'-diaminobiphenyl, N-(3-aminophenyl)-4-aminobenzamide, 4-Aminophenyl 3-amino-benzoate, N,N-Bis(4-aminophenyl)aniline, 2,6-Diaminotoluene, 1,3-diamino-5-benzenesulfonic acid, 4,6-Dichloro-1,3-phenylenediamine, 3,3'-dichloro-4,4'-diaminodiphenylmethane, 2,4,6-Trichlorometa-phenylenediamine, 4,4'-Diaminotriphenyl-methane, Bis(4-amino-2,5-diethoxyphenyl)phenylmethane, 2,8-dimethyl-3,7-diaminodibenzothiophene 5,5-dioxide and its isomers, such as 2,6-dimethyl-3,7-diaminodibenzothiophene 5,5-dioxide and 4,6-dimethyl-3,7-diaminodibenzothiophene-5,5-dioxide, 4-Isopropylmetaphenyl enediamine, 2,5,2',5'-Tetrachloro-benzidine, 2,6-Dichloro-p-phenyl-enediamine, 3,3'-Dichlorobenzidine, 2,2'-Diaminodiphenyl-methane, 2,2'-Diamino-3,5,6-trichlorodiphenylmethane 2,2-Bis(4-aminophenyl)-1,3-diphenylpropane, 2,2-Bis[4-(4-aminophenoxy)phenyl]propane, 3,3'-dihydroxy-4,4'-diaminodiphenyl, 3,3'-dicarboxy-4,4'-diaminodiphenyl, 3,3'-dicarboxy-4,4'-diaminodiphenylmethane, 3,3',5,5'-tetrachloro-4,4'-diaminodiphenyl, 2,4-dimethyl-m-phenylenediamine, 3,5-diaminobenzoic acid (DABA), 3,3'-diaminodiphenyl-sulfone, 3,3'-diamino-4,4'-dihydroxy-diphenylsulfone, 3,3'-diamino-4,4'-dihydroxy-biphenyl, 1,4-diaminoanthraquinone, 2,5-diisopropyl-1,4-phenylene diamine, 2,5-dicyclohexy-1,4-phenylene diamine, 2,5-di-tertbutyl-1,4-phenylene diamine, 2,4-diamino-benzenesulfonic acid, 2,4-diamino-1,5-benzene disulfonic acid, 3,5-diamino-tert-butyl benzene, 3,5-diamino-benzylalcohol, 2,4-diaminodiphenylamine, 2,4,6-Trimethyl-1,3-Phenylenediamine, 4,4'-(Hexafluoroisopropylidene)-dianiline, 2,4-Diaminophenol, 2,5-Diamino-1,4-Benzenedithiol, 4,4'-[1,4-Phenylenebis(1-Methyl-ethylidene)]4,4'-Methylene dianiline 1,4-Bis(4-aminophenoxy)benzene 1,4-Bis(4-aminophenoxy)benzene 2,2-(3-Amino-4-hydroxyphenyl)hexafluoropropane, 1,5-Nathalene diamine, 2,6-Nathalene diamine, 3,6-(9,9-dialkyl)fluorene diamine, 2,7-(9,9-phenyl)fluorene diamine, 2,4-diaminodiphenylamine, and 1,2,4,5-tetraminobenzene.

The tetracarboxylic dianhydride and diamine components can be used either individually or as a mixture of two or more thereof or in combination to produce polyimide polymer or copolymer.

It is desired for a polyimide to have a relatively high molecular weight to produce membranes with good mechanical properties. Thus, the polymerization and imidation reaction between a tetracarboxylic dianhydride component and a diamine component at a ratio close to 1 results in polyimide with a relatively high molecular weight. The molar ratio of a tetracarboxylic acid component and a diamine component is preferred to be 0.95:1 to 1.05:1, more preferably 0.98:1 to 1.02:1, to obtain a polyimide component having a relatively high molecular weight.

The polymerization and imidation reaction is carried out by reacting a tetracarboxylic dianhydride component and a diamine component at a predetermined ratio in a polar solvent at a temperature from 0 degrees C. to 250 degrees C. (the temperature not being higher than the boiling point of the solvent), whereby polyamic acid is formed, followed by dehydration and ring closure to form an imide group. The imidation step can be carried out by thermal or chemical means. By thermal means, the polyamic acid solution is heated at a temperature from 120 degrees C. to 250 degrees C. By chemical means, the polyamic acid solution is heated with a dehydrating agent at a temperature of 30 degrees C. to 120 degrees C.

The polyamides suitable for the present invention can be obtained by, e.g., reacting a diacid or diacid chloride component with a diamine component at a pre-determined ratio in a polar solvent.

Specific examples of diamines suitable for the production of polyamides of the present invention are listed above. Specific examples of suitable diacids include but are not limited to the following: Diphenyl ether 4,4'-dicarboxylic acid, Diphenyl sulfone 4,4'-dicarboxylic acid, 4,4'-Benzophenenone-dicarboxylic acid, Diphenylbis(trifluoromethyl)methane-4,4'-dicarboxylic acid, Isophthalic acid, Terephthalic acid, 4,4'-Propylidenedibenzoic acid, 4-Methylisophthalic acid, 4,4'-Methylenedibenzoic acid, Diphenyl sulfide 4,4'-dicarboxylic acid, 2,6-Pyridinedicarboxylic acid, 4,4'-Diethylsilanedibenzoic acid, 4,4'-Diphenylsilanedibenzoic acid, 4,4'-Bisbenzoic acid 14 4,4'-Bisanisic acid, Bis(4-carboxyphenyl)ethylphosphine oxide, 1,5-Naphthalenedicarboxylic acid, 4,4'-Bis(o-toluic) acid, 4-Bromoisophthalic acid, 1,5-Anthracene dicarboxylic acid, 2,6-nathalene dicarboxylic acid, 3,6-(9,9-dialkyl)fluorene dicarboxylic acid, 2,7-(9,9-dialkyl)fluorene dicarboxylic acid, 2,5-thiophene dicarboxylic acid, Bis(4-carboxyphenyl)methyl amine, and Bis(4-carboxyphenyl)phenyl amine.

Suitable dicarboxylic acid chlorides can be easily prepared from the dicarboxylic acids listed above.

Polysulfones and polyethersulfones useful in the present disclosure can be prepared in a variety of ways, such as nucleophilic aromatic substitution reaction between di-phenols and aromatic di-halide, or by condensation procedures described in GB 1,060,546.

The invention also contemplates the use of copolymers, such as copolyimides, and copolyamides, as well as physical blends of two or more of these materials.

In order to increase the glass transition temperature of the polymer and provide additional rigidity to the polymer chain, crosslinking additives can be utilized to promote crosslinking after the membrane is formed. This can be done thermally, chemically, electrically or with radiative exposure.

There are numerous methods for crosslinking that are familiar to one skilled in the art. Some representative crosslinking strategies include, but are not necessarily limited to:

a) reacting an amine or carboxylic acid or other Lewis basic units with di-epoxide crosslinkers;

b) reacting epoxide units within the polymer with difunctional amines, carboxylic acids, or other difunctional Lewis basic unit;

c) irradiative or radical-initiated crosslinking of double bond-containing units, such as acrylates, methacrylates, cinnamates, or other vinyl groups;

d) reacting multivalent metal salts with ligating groups within the polymer (the reaction of zinc salts with carboxylic acid-containing polymers is an example);

e) using crosslinkable moieties that react via the Knoevenagel condensation reaction, such as (2-acetoacetoxy)ethyl acrylate and methacrylate;

f) reacting amine, thiol, or carboxylic acid groups with a divinyl compound (such as bis(vinylsulfonyl)methane) via a Michael addition reaction;

g) reacting carboxylic acid units with crosslinkers having multiple aziridine units or carbodiimide units;

h) reacting crosslinkers having multiple isocyanate units with amines, thiols, or alcohols within the polymer;

i) mechanisms involving the formation of interchain sol-gel linkages, such as the trimethoxysilyl moiety;

j) thermal crosslinking of ethynyl groups attachment to the polymer;

k) auto oxidative crosslinking, such as employed by alkyd resins;

l) sulfur vulcanization;

m) processes involving ionizing radiation; and n) thermal cyclization of trifluorovinylether to form perfluorocyclobutane.

The crosslinking moieties are preferable attached to polymer backbone as pedant side chain. For example, the crosslinking moiety can be incorporated into monomers as substituted aromatic dianhydrides, diamine, and hydroquinone or biphenol.

Chemical exposure methods to create the desired voids in glassy polymers include but are not limited hydrolysis, oxidation, ozonation, fluorination, or fluorooxidation. Ester groups or oligomeric polyester groups either incorporated as labile pendant side chains or as labile additives to the glassy polymer matrix can be eliminated by hydrolysis with high temperature water and/or water/acid exposure yielding degradation products that can be eliminated from the membrane by diffusion. Polyether groups can be subjected to base degradation by exposure to $NH_3$ and water.

Radiative methods to create the desired voids in glassy polymers include, but are not limited to UV, electron beam, X-ray, beta and gamma radiation, and far infrared. These processes offer the potential advantages of operating at relatively low temperatures to degrade the labile groups or additives. In some cases, such as UV radiation, the process can be optimized for promoting specific degradation reactions at specific wavelength and energy level. In the case of chemical or radiative exposure to degrade the pendant labile groups or additives, the polymer backbone or polymer matrix must be stable to such treatment.

The thermal, chemical, electrical or radiative exposure to degrade pendant labile groups or additives can be conducted on the membrane in either a batch or continuous mode. In the continuous mode, the process could be conducted during the membrane fabrication or off-line after membrane drying. The batch mode could be conducted on membrane for situations where exposure times are not amenable for continuous operations.

The molecular weight of the glassy polymer is important in the formation of a membrane. Preferable, the glassy polymers of the present invention have a molecular weight above the entanglement molecular weight of the polymer to achieve materials that have high strength and are not brittle. If the molecular weight of the polymer is too low the membrane is too brittle. If the molecular weight is too high, processability can become difficult. The glassy polymers of the present invention preferably have an average molecular weight of from 10,000 to 400,000, more preferably from 20,000 to 350,000, still more preferably from 25,000 to 300,000.

The membranes produced from the glassy polymer of the present invention can take any form known in the art, for example hollow fibers, tubular shapes, spiral wound, pleated, flat sheet, or polygonal tubes. A preferred form for the hollow fiber membranes is integrally skinned or composite asymmetric hollow fibers, which provides both a very thin selective skin layer and a high packing density, to facilitate use of large membrane areas. Multiple hollow fiber membrane tubes are preferred for their relatively large contact area. The contact area may be further increased by adding additional tubes or tube contours.

Hollow fibers can be formed, for example, by extruding a polymer solution through an annular capillary nozzle, e.g., a spinneret, with a core fluid used for the purpose of retaining the hollow fiber geometry. The process involves the phase inversion of the glassy polymer solution of the present invention. A phase inversion process is a known film formation technique in which a polymer solution is brought into contact with a coagulation bath to cause phase inversion. The phase inversion process described by Loeb, et al. in U.S. Pat. No. 3,133,132, involves forming a polymer solution into film, evaporating the solvent from the film of the polymer solution, which can lead to the development of a dense layer, then immersing the film into a coagulating bath (a solvent miscible with the solvent of the polymer solution and non-solvent for the polymers (incapable of dissolving the polymer)) to induce phase separation thereby to form fine pores, which can lead to the formation of a porous support layer. The dense layer has such denseness as to have substantially different permeation rates depending on gas species and therefore functions to separate gas species. On the other hand, the porous support layer has such porosity as to have practically no gas separation functionality.

Asymmetric hollow fiber membrane can be provided by extruding a solution of glassy polymer through a spinneret into hollow fiber geometry. The glassy polymer solution is forced through a spinneret with a core fluid used for the purpose of retaining the hollow fiber geometry. Immediately thereafter, the extruded hollow fibers are passed through an air or nitrogen gas atmosphere and then immersed in a coagulation bath substantially incapable of dissolving the polymer components and compatible with the solvent of the glassy polymer solution to form an asymmetric structure. Subsequently, the hollow fibers are dried and, if desired, heat treated to make a separation membrane.

These fibers typically have a diameter similar to a human hair and offer the advantage of very high surface area per unit volume. Industrial hollow fiber membrane modules typically contain up to hundreds of thousands of individual hollow fibers. Specifically, to maximize productivity, the hollow fibers typically include an ultrathin (<2000 Angstroms) dense layer on a porous support. Gas separation is accomplished through this selective dense layer. This selective dense layer may be supported on the same polymer to form an integrally skinned asymmetric hollow fiber membrane. The selective dense layer may be located on either the outer or inner surface of the hollow fiber. The most advanced membranes have an asymmetric sheath with the selective dense layer supported on an inexpensive porous core support layer (different polymer) to form a composite hollow fiber membrane as described in U.S. Pat. No. 5,085,676, the contents of which are hereby incorporated by reference. The glassy polymer of the present invention can be used both as dense layer and support layer for the hollow fiber membrane.

In order to stably maintain the hollow fiber shape immediately after the extrusion, the glassy polymer solution to be extruded through the spinneret can have a solution viscosity of 20,000 to 300,000 centipoise, preferably 30,000 to 250,000 centipoise, more preferably 40,000 to 200,000 centipoise, at the spinning temperature of between 25 degrees C. to 100 degrees C. Coagulation is preferably carried out by first immersion in a first coagulation bath where the membrane is coagulated to an extent enough to retain its hollow fiber shape, taking up the membrane by a guide roll, and a second immersion in a second coagulating bath, and optionally into additional successive baths, where the membrane is thoroughly coagulated and effectively washed to remove solvent and nonsolvents. The hollow fiber membranes then undergo an efficient drying process to remove the coagulating liquid.

In the present invention, the thermal, chemical, electrical or radiative exposure to degrade pendant labile groups or additives can be conducted on the membrane in a batch or a continuous mode. In the continuous mode, the process can be conducted during the membrane fabrication or off-line after membrane drying. The batch mode can be conducted on membrane fiber bundles for situations where exposure times are not amenable for continuous operations. For thermal exposure, the heat treatment is conducted at a temperature below the glass transition temperature of the glassy polymer matrix.

Selection of the glassy polymer solutions or polymer matrix/additive mixture solutions for use in the production of the membrane depends on the solubility characteristics of the polymer or polymer matrix/additive, and the viscosity requirement of the solution. Typically, the amount of polymer or polymer matrix/additive in solution can vary from about 10 to about 60 weight percent, preferably from about 15 to about 50 weight percent, more preferably from about 20 to about 45 weight percent. If the concentration is too low and solution has low viscosity, the membrane is prone to have defects during phase inversion process. If the concentration of is too high and the solution has high viscosity, the membrane tends to have thicker dense layer or reduced porosity as porous support layer resulting in reduced rate of permeation.

A viscosity enhancing agent or viscosity enhancing salt may be useful for making a polymer solution suitable for spinning into hollow fibers.

Typical solvents for the glassy polymer solutions include but are not limited to solvents such as dimethyl formamide, N,N-dimethylacetamide, N-methylpyrrolidone, dimethyl sulfoxide and the like.

Mixtures of solvents also may be used in the glassy polymer solutions employed to form the layers of the membrane. The specific mixture of solvents may vary depending on the solubility parameters of the polymer and the viscosity of the solution. For example, two or more solvents may be used which vary in volatility or solvation power.

The solvent mixture can also contain additional components, such as polymer swelling agents, and nonsolvent components. These added components may be useful, for example, to achieve a desired anisotropy in a layer by moving the polymer solution closer to its point of incipient gelation. These additional components may be characterized as extractable or nonextractable in the coagulation bath. Extractable components, that is, materials which are extractable in an aqueous-based coagulation bath, may be useful, for example, as pore formers in a layer. Examples of extractable components include inorganic salts, and polymers, such as polyvinyl pyrrolidone. Nonextractable components may find utility as, for example, membrane permeation modifiers. Nonextractable materials vary in composition dependent on whether the end use of the polymer is the dense separating layer or the porous support layer, the composition of the polymer, solvent mixture and coagulation bath. Examples of the additional components which may be employed include, for example, discrete monomeric materials which are insoluble in the composition of the coagulation bath, polymerizable materials, such as moisture-curable siloxanes, and compatible or non-compatible polymers. These examples of additional components are merely illustrative and should not be considered limiting.

Suitable coagulation baths for the membranes vary depending on the composition of the polymer solutions employed and the results desired. Generally, the coagulation bath is miscible with the solvents of the polymers, but is a non-solvent for the polymers of each layer. However, the coagulation bath may be varied to achieve desired properties in the layer. This may be desirable depending on the solubility parameters of the dense layer polymer, or when specialized membrane configurations are desired. For example, the solvent of the dense layer polymer solution may be immiscible in the coagulation bath whereas the solvent of the support layer polymer solution may be miscible in the coagulation bath. A coagulation bath therefore may be a multicomponent mixture of water and an organic solvent that is miscible with water and the solvent to be removed from the polymer. The temperature and composition of the bath also may be controlled to affect the extent and rate of coagulation. The desired coagulation media is water as it is nontoxic, nonflammable, low cost and usually an excellent coagulation media for the polymers. Water/alcohol mixtures or other water mixtures with soluble organic species to optimize the membrane properties can also be considered.

Hollow fibers can be employed in bundled arrays potted at either end to form tube sheets and fitted into a pressure vessel thereby isolating the insides of the tubes from the outsides of the tubes. Devices of this type are known in the art. Sheets can be used to fabricate a flat stack permeator, which includes a multitude of membrane layers alternately separated by feed-retentate spacers and permeate spacers. The layers can be glued along their edges to define separate feed-retentate zones and permeate zones. Devices of this type are described in U.S. Pat. No. 5,104,532, the contents of which are hereby incorporated by reference.

Hollow fibers can be employed in bundled arrays of a few hollow fibers to several hundreds of thousands of hollow fiber membranes potted at either end to form tube sheets and fitted into a pressure vessel. The resulting hollow fiber membrane element has at least a mixed gas inlet, a permeate outlet, and a retentate (non-permeate) outlet in such a manner that the space leading to the inside of the individual hollow fibers and the space leading to the outside of the hollow fibers are isolated from each other. A gas mixture is fed from the mixed gas inlet to the space in contact with the inside or outside of the hollow fiber membrane. While the mixed gas flows along the hollow fiber membrane, a specific component in the mixed gas selectively passes through the membrane. The permeate gas is discharged from the permeate outlet, while the retentate gas that has not passed through the membrane is discharged from the retentate outlet, thus accomplishing gas separation. Devices of this type are known in the art.

The number of fibers bundled together will depend on fiber diameters, lengths, and porosities and on desired throughput, equipment costs, and other engineering considerations understood by those in the art.

The membranes can be included in a separation system that includes an outer perforated shell surrounding one or more inner tubes that contain the membranes. In one mode of operation, a gaseous mixture enters the separation system and the gaseous mixture passes through the inner tubes. As the gaseous mixture passes through the inner tubes, one or more components of the mixture permeate out of the inner tubes.

The membranes can be included in a cartridge and used for permeating contaminants from a gaseous mixture. The contaminants can permeate out through the membrane, while the desired components continue out of the membrane cartridge.

The membranes may be stacked within a perforated tube to form the inner tubes or may be interconnected to form a self-supporting tube. Each one of the stacked membrane elements may be designed to permeate one or more components of the gaseous mixture. For example, one membrane may be designed for removing carbon dioxide, a second for removing hydrogen sulfide, and a third for removing nitrogen. The membranes may be stacked in different arrangements to remove various components from the gaseous mixture in different orders.

Different components may be removed into a single contaminant collection zone and disposed of together, or they may be removed into different zones. The membranes may be arranged in series or parallel configurations or in combinations thereof depending on the particular application.

The membranes may be removable and replaceable by conventional retrieval technology, such as wire line, coil tubing, or pumping. In addition to replacement, the membrane elements may be cleaned in place by pumping gas, liquid, detergent, or other material past the membrane to remove materials accumulated on the membrane surface.

A gas separation system including the membranes described herein may be of a variable length depending on the particular application.

The gaseous mixture can flow through the membrane(s) following an inside-out flow path where the mixture flows into the inside of the tube(s) of the membranes and the components which are removed permeate out through the tube. Alternatively, the gaseous mixture can flow through the membrane following an outside-in flow path.

In order to prevent or reduce possibly damaging contact between liquid or particulate contaminates and the membranes, the flowing gaseous mixture may be caused to rotate or swirl within an outer tube. This rotation may be achieved in any known manner, for example using one or more spiral deflectors. A vent may also be provided for removing and/or sampling components removed from the gaseous mixture.

The membranes are preferably durable, resistant to high temperatures, and resistant to exposure to liquids. The materials may be coated, ideally with a polymer, to help prevent fouling and improve durability. Examples of suitable polymers include those described in U.S. Pat. Nos. 5,288,304 and 4,728,345, the contents of which are hereby incorporated by reference. Barrier materials may also be used as a pre-filter for removing particulates and other contaminants which may damage the membranes.

The membrane of the present invention is particularly useful for separating fluid (i.e., gas and/or liquid) components. For example, applications include enrichment of air by nitrogen or oxygen, nitrogen or hydrogen removal from methane streams, removal of carbon dioxide, hydrogen sulfide and water vapor from any gas such as, for example, natural gas streams, or carbon monoxide from syngas streams. The membrane can also be used in hydrogen separation from refinery streams and other process streams, for example from the dehydrogenation reaction effluent in the catalytic dehydrogenation of paraffins. Generally, the membrane may be used in any separation process with fluid mixtures involving, for example, hydrogen, nitrogen, methane and other hydrocarbons, carbon dioxide, carbon monoxide, helium or other noble gases, oxygen, water vapor and hydrogen sulfide. In preferred embodiments, separation is performed on a feed fluid comprising a gas pair selected from the group consisting of $O_2/N_2$, $CO_2/CH_4$, $CO_2/N_2$, $H_2/N_2$, $He/N_2$, $H_2/CH_4$, $He/CH_4$, $He/H_2$, $H_2/CO_2$, $H_2O$/at least one other gas, and $He/CO_2$.

Of particular interest is air separation, where nitrogen as the non-permeating gas stream is enriched and available for use as a blanketing atmosphere for flammable fluid protection (such as oil, gasoline and other flammable chemical storage and transportation). A prominent example of this is a membrane system used onboard oil tankers to provide a blanketing nitrogen atmosphere. Another well-known use is the use of membranes to provide nitrogen atmospheres for perishable food and flowers. Nitrogen atmosphere blanketing using membranes is also employed for annealing, carbonizing, sintering, wave soldering and laser cutting. Nitrogen from membranes is also employed for tire inflation. Air enrichment of oxygen for enhanced combustion applications would benefit from membranes of the present invention. Another application involves $CO_2/CH_4$ separation with primary emphasis on natural gas separation from various natural gas sources including landfill gas, enhanced oil recovery applications involving $CO_2$ injection and coal bed methane purification. Another $CO_2$ separation of future potential interest involves $CO_2/N_2$ separation of flue gas to collect the $CO_2$ for environmental sequestration. Hydrogen sulfide removal from natural gas is another application presently employing membranes relevant to this invention. Hydrogen separation processes of interest include $H_2/N_2$ separation of ammonia purge gas and $H_2/CH_4$ separation for various petrochemical processes. $H_2/CO$ separation is another separation of interest in the petrochemical industry. The membranes can be utilized in gas separation hybrid processes involving purification of streams for pressure swing adsorption or cryogenic separation of gases. Helium purification from natural gas sources or helium recovery from applications, such as helium based blimps and deep-diving applications are also within the scope of the invention. Dehydration of compressed air or natural gas, a well-known membrane separation method, is also of interest. Specific membranes of the present invention can be useful for alkane/alkene separation, such as propane/propylene or ethane/ethylene.

While the invention has been described in detail and with reference to specific examples thereof, it will be apparent to one skilled in the art that various changes and modifications can be made therein without departing from the spirit and scope thereof.

EXAMPLES

In the following examples, unless stated otherwise, weight average molecular weight ($M_w$) was obtained by size exclusion chromatography (GPC) on a Waters Alliance 2690 Separator System connected to 2410 RI and 2996 PDA detectors using PLgel 10 um MIXED-BLS 300×7.5 mm GPC columns. HPLC grade tetrahydrofuran (THF) was employed as mobile phase and N-methylpyrrolidone (NMP) as a flow mark. Samples of the polymer for GPC analysis were prepared in the following manner. About 20 mg amount of the polymer was charged into a 20 mL sample vial. A 10 g of THF with a drop of NMP was also added into the 20 mL vial to dissolve the polymer and provide a 0.15% to 0.2% weight concentration solution. About 1.0 mL of the solution was filtered through a 0.45 um nylon filter, and then transferred into a sample vial and place on the auto sample carousel, and was analyzed via GPC at a temperature of 40° C. and a flow rate of 1 mL/min to determine the molecular weight using polystyrene as a standard.

Differential scanning calorimetry (DSC) analysis was performed using TA Instruments model 2920 differential scanning calorimeter using a heating rate of 20° C./min and a helium purge gas having a flow rate of 25 cubic centimeter (ccm)/minute using a crimped aluminum pan. Thermal gravity analysis (TGA) was performed on a TA Instruments model TGA Q5000 at a heating rate of 10 degrees C./min to 600 degrees C. under a nitrogen flow of 25 ccm/minute.

Scheme 1 and Table 1 lists the polymer structures synthesized in the following examples. Scheme 2 illustrates the synthesis of the intermediate compounds employed in the synthesis of the polymers.

Scheme 1. Polymer Structures

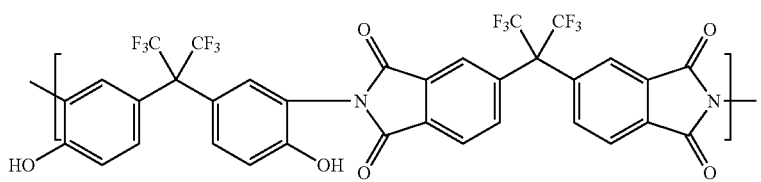

P1

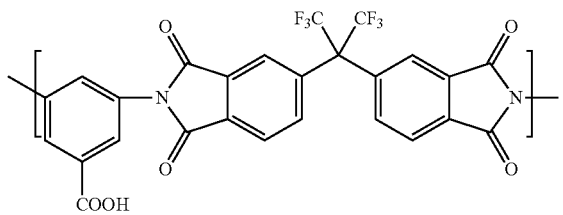

P2

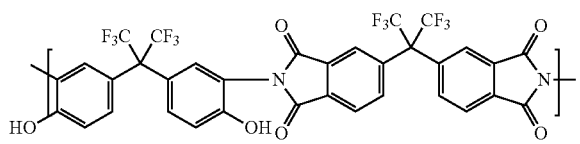

P3, P4, P5, P6, P7, P8, P9

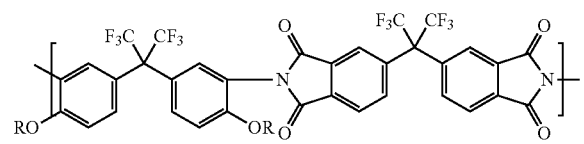

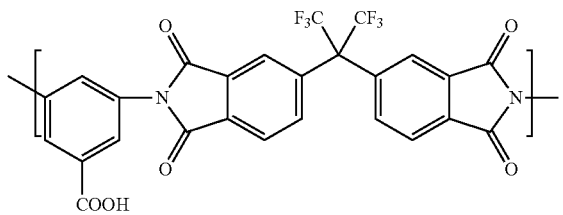

P10, P11, P12

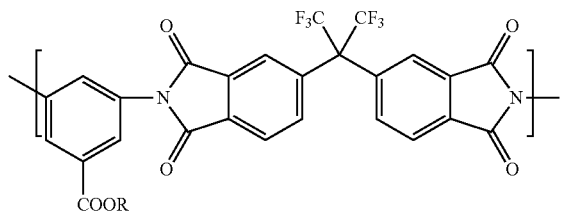

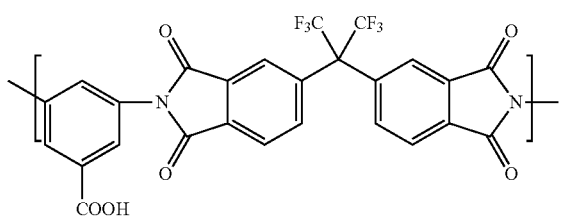

P13

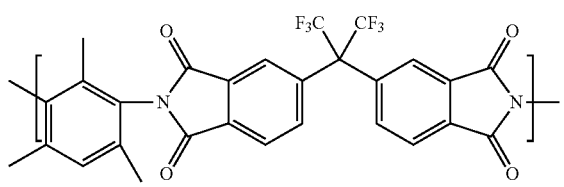

TABLE 1

List of Polymer Structures

| Polymer | R | Starting polymer | Condition |
|---|---|---|---|
| P3 | —CH$_2$CN | P1 | BrCH$_2$CN/K$_2$CO$_3$ |
| P4 | —CH$_2$CN | P1 | BrCH$_2$CN/Cs$_2$CO$_3$ |
| P5 | —(CO)OCH$_3$ | P1 | Cl(CO)OCH$_3$/pyridine |
| P6 | —(CO)OCH$_3$ | P1 | Cl(CO)OCH$_2$CCl3/pyridine |
| P7 | —SiMe$_2$(t-C$_4$H$_9$) | P1 | ClSiMe2(t-C$_4$H$_9$)/imidazole |
| P8 | —(CO)CH$_2$CH$_2$Br | | Cl(CO)CH$_2$CH$_2$Br/triethylamine |
| P9 | [structure] | P1 | [structure] COCl/triethylamine |
| P10 | [structure] | P2 | [structure] /oxalyl chloride/triethylamine |
| P11 TLG39 | [structure] | P2 | [structure] OH/oxalyl chloride/triethylamine |
| P12 TLG38 | [structure] | P2 | [structure] /oxalyl chloride/triethylamine |

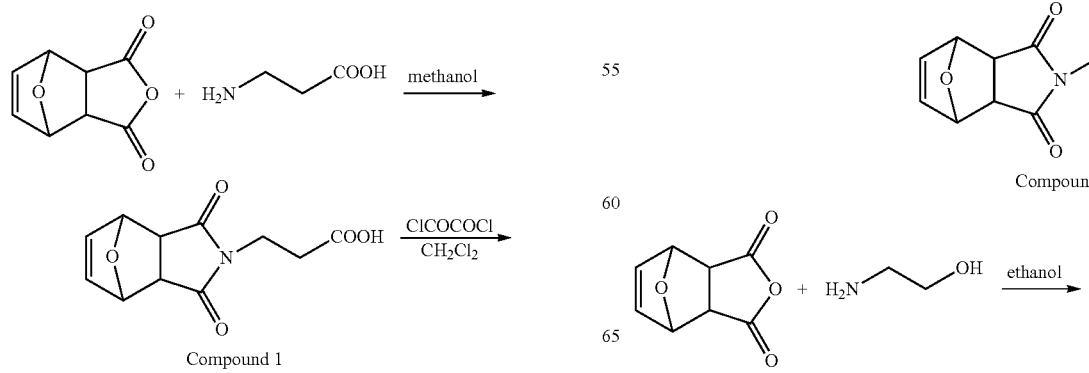

Scheme 2. Synthesis of Intermediate Compound 1-5

Compound 1

Compound 2

-continued

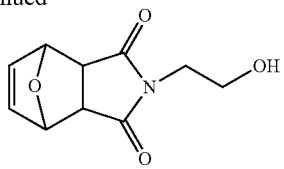

Compound 3

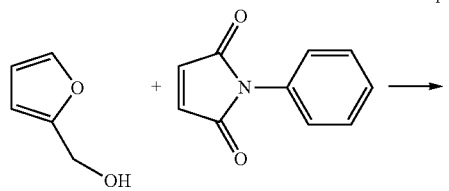

Compound 4

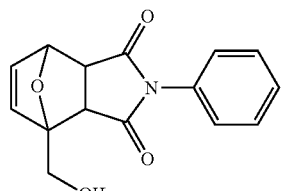

Compound 5

Example

Synthesis of Intermediate Compounds 1-5

Compound 1

Synthesis of 3-(exo-3,6-epoxy-1,2,3,6-tetrahydro-phthalimido)propanoic acid

Compound 1 was synthesized according to a literature procedure (Gandini, A. et al. J. Polym, Sci. Part A Polym. Chem. 2010, 48, 2053). A 500 mL 3-neck round-bottomed flask was equipped with a mechanical stirrer, a condenser and a nitrogen inlet. To the flask was added furan-maleic anhydride Diels-Alder adduct exo-3,6-epoxy-1,2,3,6-tetrahydrophthalic anhydride (purchased from Aldrich) (51.2 g, 0.31 mol) and Na2CO3 (32.7 g, 0.31 mol) in MeOH (220 mL). Beta alanine (purchased from Aldrich) (27.5 g, 0.31 mol) was added slowly to the reaction under mixing. The solution was heated to reflux under nitrogen for 3 days. Then the solvent was removed under reduced pressure, and the white residue dissolved in 300 of $CH_2C_{12}$ and washed with 150 mL of 1M aqueous HCl 3 times. The organic layer was dried over anhydrous sodium sulphate and concentrated under reduced pressure. Only little of expected product was obtained as white crystals. The aqueous phase was combined and the product was salted out by adding sodium chloride. The combined yield was 10.5 g product. $^1$H NMR and $^{13}$C NMR indicated pure desired product.

Compound 2

Synthesis of 3-(exo-3,6-epoxy-1,2,3,6-tetrahydro-phthalimido)propanoyl chloride (TLG32)

A 250 mL 3-neck round-bottomed flask was equipped with a mechanical stirrer, a condenser and a nitrogen inlet. To the flask was compound 1 (9.7 g, 41 mmol) and 90 mL of methylene chloride. Compound 1 was not soluble in methylene chloride and was suspending in the solvent. One drop of dimethyl formamide (DMF) was added to the mixture. Under vigorous stirring, oxalyl chloride (purchased from Aldrich) (10.4 g, 82 mmol) was added drop wise to the reaction. The reaction started bubbling upon addition of oxalyl chloride and the compound 1 started to react and dissolve in methylene chloride. After stirring at room temperature under nitrogen, solvent was removed under reduced pressure, and the light brown product was dried under vacuum at 45 degrees C. overnight. $^1$H NMR and $^{13}$C NMR indicated pure desired product at quantitative yield.

Compound 3

Synthesis of 4-hydroyethyl-10-oxa-4-aza-tricyclo[5.2.1.0]dec-8-ene-3,5-dione

Compound 3 was synthesized according to a literature procedure (Zhou, Z. et al. Syn. Comm. 2000, 30(19), 3527). To a 500 mL 3-neck round bottomed flask equipped with a condenser, an additional funnel and a mechanical stirrer was added furan-maleic anhydride Diels-Alder adduct exo-3,6-epoxy-1,2,3,6-tetrahydrophthalic anhydride (purchased from Aldrich) (50.0 g, 0.30 mol) and 210 mL of absolute ethanol. Under vigorous stirring, 2-aminoethanol (purchased from Aldrich) (18.4 g, 0.30 mol) was added drop wise. Reaction was exothermic. Reaction was heated under reflux for 8 hours. After cooling down, solvent was removed under reduced pressure and 120 mL of methanol was added. White solid was filtered off, washed with methanol and dried under vacuum. 20.0 g of solid was obtained. $^1$H NMR and $^{13}$C NMR indicated pure desired product.

Compound 4

Synthesis of 1-hydroxymethyl-4-phenyl-10-oxa-4-aza-tricyclo[5.2.1.0]dec-8-ene-3,5-dione Compound 4 was synthesized according to a literature procedure (Jegat, C. et al. Polym. Bull. 2008, 60, 799). To a 250 mL 3-neck round bottomed flask equipped with a mechanical stirrer and a nitrogen net was added furfuryl alcohol (purchased from Aldrich) (28.4 g, 0.29 mol) and phenyl maleimide (purchased from Aldrich) (50.1 g. 0.29 mol). Phenyl maleimide slowly dissolved in furfuryl alcohol. Reaction slowly became viscous and after overnight, completely solidified. $^1$H NMR and $^{13}$C NMR indicated pure desired product in quantitative yield.

Compound 5

Synthesis of 4-ethyl-1-hydroxymethyl-10-oxa-4-aza-tricyclo[5.2.1.0]dec-8-ene-3,5-dione Compound 5 was synthesized similarly to compound 4. Furfuryl alcohol (19.3 g, 0.20 mol) reacted with ethyl maleimide (purchased from Aldrich) (24.6 g, 0.20 mol to form desired product as viscous liquid, which crystallized slowly upon standing at room temperature. $^1$H NMR and $^{13}$C NMR indicated pure desired product in quantitative yield.

Synthesis of Polymers

Example 1

Synthesis of Polymer P1 6FDA-bisAPAF

An oven dry 3-neck 500 mL round-bottomed flask was equipped with a mechanical stirrer, a nitrogen inlet, a thermocouple, and a drying tube. To the flask was added 4,4'-(Hexafluoroisopropylidene)diphthalic anhydride (6FDA, purchased from DuPont Company) (41.30 g, 0.093 mol) and N-methylpyrrolidone (NMP, electronic grade purchased from Mallankroft) (96.5 g). The mixture was stirred under nitrogen at room temperature for half hour. 2,2-(3-amino-4-hydroxyphenyl)hexafluoropropane (bisAPAF, purchased from Central Glass Corporate, Japan) (33.70 g, 0.093 mol) was dissolved in 101 g of NMP and added to an additional funnel. The bisAPAF solution was added drop wise to the 6FDA/NMP mixture in the flask to maintain temperature below 40 degrees C. After addition, the additional funnel was rinsed with 27.5 g of NMP. The viscous solution was stirred at room temperature under nitrogen overnight. To the reaction was added 27 g of xylenes (purchased from Aldrich Chemical Company). The drying tube was replaced with a Dean-Stark trap and a condenser, and the drying tube was now connected to the condenser. The Dean-Stark trap was filled with 22 g of xylenes. The reaction was heated up slowly with a heating mantle to reflux. The polymerization temperature was maintained between 160 to 180 degrees C. After 24 hours of heating, xylenes was distilled from Dean-Stark trap. After distillation, the polymerization was held at 186 degrees C. for an hour and then cooled down to room temperature. The polymer solution contained about 25% polymer in NMP. A sample of polymer was precipitated into cold water. The polymer was filtered, rinsed with water and dried under vacuum at 100 degrees C. overnight. GPC indicated the polymer has a weight average molecular weight of 164,218.

Example 2

Synthesis of Polymer P2: 6FDA-DABA

Polymer P2 was prepared similarly to polymer P1. 4,4'-(Hexafluoroisopropylidene)diphthalic anhydride (6FDA, purchased from DuPont Company) (33.45 g, 0.075 mol) was reacted with 3,5-diaminobenzoic Acid (DABA, purchased from Acros Organics) (11.52 g, 0.076 mol) in 180 g of N-methylpyrrolidone (NMP, electronic grade, purchased from Mallinkroft) and 25 g of xylenes. The polymerization temperature was maintained between 167-174 degrees C. for 24 hours. The polymer was precipitated into water and polymer was collected by filtration, and dried under vacuum at 100 degrees C. overnight. GPC indicated the polymer has a weight average molecular weight of 61,474.

Example 3

Synthesis of Polymer P3

A dry 3-neck 100 mL round-bottomed flask was equipped with a mechanical stirrer, a nitrogen inlet, a thermocouple, and a drying tube. To the flask was added 26.5 g of polymer P1 solution (17.1 mmol of OH group). The solution was diluted with 8.0 g of NMP. To the solution was added 2-bromoacetonitrile (purchased from Aldrich Chemical Company) (3.1 g, 26 mmol). After 5 minutes of mixing, potassium carbonate (purchased from Fisher Scientific) (3.6 g, 26 mmol) was added as solid. The reaction was stirred at room temperature overnight under nitrogen. Polymer was precipitated into water, filtered, and dried under vacuum overnight at 80 degrees C. 7.0 g of polymer was recovered. $^{13}$C NMR indicated that 54% of OH reacted to form ether linkage.

Example 4

Synthesis of Polymer P4

Polymer P4 was prepared similarly to polymer P3. Polymer P1 solution (30.6 g, 20 mmol of OH group) was diluted with 25 g of NMP, reacted with 2-bromoacetonitrile (3.6 g, 30 mmol), and cesium carbonate (purchased from Aldrich) (9.7 g, 30 mmol). 8.0 g of polymer was recovered. $^{13}$C NMR indicated that 100% of OH reacted to form ether linkage.

Example 5

Synthesis of Polymer P5

A dry 3-neck 100 mL round-bottomed flask was equipped with a mechanical stirrer, a nitrogen inlet, a thermocouple, and a drying tube. To the flask was added 54.0 g of polymer P1 solution (34 mmol of OH group). To the solution was added pyridine (purchased from Aldrich Chemical Company) (22.0 g, 278 mmol). Methyl chloroformate (purchased from Aldrich Chemical Company) (18.0 g, 191 mmol) was added via an additional funnel. The reaction was exothermic and became more viscous. 30 g of NMP was added to dilute the reaction. The reaction was stirred at room temperature overnight under nitrogen. Polymer was precipitated into water, filtered, and dried under vacuum overnight at 80 degrees C. 13.8 g of polymer was recovered. $^{13}$C NMR indicated that 22% of OH reacted to form carbonate linkage.

Example 6

Synthesis of Polymer P6

Polymer 6 was prepared similarly to polymer 5. Polymer P1 solution (50.1 g, 32 mmol of OH group) was diluted with 75 g of NMP, and reacted with trichloroethyl chloroformate (purchased from Aldrich Chemical Company) (13.7 g, 65 mmol), and pyridine (purchased from Aldrich) (7.7 g, 97 mmol). $^{13}$C NMR indicated that 47% of OH reacted to carbonate linkage.

Example 7

Synthesis of Polymer P7

A dry 3-neck 100 mL round-bottomed flask was equipped with a mechanical stirrer, a nitrogen inlet, a thermocouple, and a drying tube. To the flask was added 60.0 g of polymer P1 solution (38 mmol of OH group). The solution was diluted with 7.6 g of NMP. To the solution was added tert-butyldimethylsilyl chloride (purchased from Aldrich Chemical Company) (11.7 g, 77 mmol), and imidazole (purchased from Aldrich Chemical Company) (5.3 g, 77 mmol). The reaction was stirred at room temperature overnight under nitrogen. The reaction became very viscous and was diluted with NMP before precipitating into water. The polymer was filtered, and dried under vacuum overnight at 80 degrees C. 18.8 g of polymer was recovered. $^{13}$C NMR indicated that 80% of OH reacted to form silyl ether linkage.

Example 8

Synthesis of Polymer P8

A dry 3-neck 100 mL round-bottomed flask was equipped with a mechanical stirrer, a nitrogen inlet, a thermocouple, and a drying tube. To the flask was added 50.0 g of polymer P1 solution (36 mmol of OH group). The solution was diluted with 50 g of NMP. To the solution was added triethylamine (purchased from Aldrich Chemical Company) (4.0 g, 40 mmol). After 5 minutes mixing, 4-bromobutyryl chloride (purchased from Aldrich Chemical Company) (7.4 g, 40 mmol) was added drop wise to maintain temperature below 40 degrees C. The reaction was stirred at room temperature overnight under nitrogen. The polymer was precipitated into water, filtered, and dried under vacuum overnight at 80 degrees C. 16.2 g of polymer was recovered. $^{13}$C NMR indicated that 82% of OH reacted to form ester linkage.

Example 9

Synthesis of Polymer P9

An oven dry 3-neck 100 mL round-bottomed flask was equipped with a mechanical stirrer, a nitrogen inlet, a thermocouple, and a drying tube. To the flask was added 26.0 g of polymer P1 solution (16.8 mmol of OH group). The solution was diluted with 20 g of NMP. To the solution was added compound 2 (6.4 g, 25.2 mmol). Triethylamine (2.6 g, 25.2 mmol) was added drop wise to maintain temperature below 40 degrees C. The reaction was stirred at room temperature overnight under nitrogen. The polymer was precipitated into water, filtered, and dried under vacuum overnight at 80 degrees C. 7.2 g of polymer was recovered. $^{13}$C NMR indicated that 96% of OH reacted to form ester linkage.

Example 10

Synthesis of Polymer P10

An oven dry 3-neck 100 mL round-bottomed flask was equipped with a mechanical stirrer, a nitrogen inlet, a thermocouple, and a drying tube. To the flask was added 6 g of polymer P2 (9 mmol of COOH group). The polymer was suspended in 50 g of anhydrous methylene chloride under nitrogen. One drop of DMF was added. To the suspension was added oxalyl chloride (2.27 g, 18 mmol) drop wise. The reaction started bubbling and polymer slowly dissolved upon reacting. The reaction was stirred at room temperature under nitrogen for 6 hours. Upon this time, polymer completely dissolved and the solution was dark brown. Solvent methylene chloride was removed under reduced pressure. The residue was then dissolved in 100 g of NMP. To the solution was added compound 4 (3.15 g, 12 mmol). The mixture was stirred for 10 minutes, and triethyl amine (1.17 g, 12 mmol) was added slowly. The reaction was stirred at room temperature under nitrogen overnight. Polymer was precipitated into water, filtered, and dried under vacuum overnight at 80 degrees C. 6.5 g of polymer was recovered. $^{13}$C NMR indicated that 47% of COOH reacted to form ester linkage.

Example 11

Synthesis of Polymer P11

Polymer P11 was synthesized similarly to polymer P10. Polymer P2 (6.0 g, 11 mmol) reacted with oxalyl chloride (2.72 g, 21 mmol) in 50 g of methylene chloride to form acid chloride which then reacted with compound 3 (2.91 g, 14 mmol) and triethylamine (1.41 g, 14 mmol) in 100 g of NMP.

Example 12

Synthesis of Polymer P12

Polymer P12 was synthesized similarly to polymer P10. Polymer P2 (6.0 g, 11 mmol) reacted with oxalyl chloride (2.72 g, 21 mmol) in 50 g of methylene chloride to form acid chloride which then reacted with compound 5 (4.78 g, 21 mmol) and triethylamine (2.17 g, 21 mmol) in 100 g of NMP.

Example 13

Synthesis of Polymer P13: 6FDA-DABA/TMPA

Polymer P13 was prepared similarly to polymer P1. 4,4'-(Hexafluoroisopropylidene)diphthalic anhydride (6FDA, purchased from DuPont Company) (1346.40 g, 3.03 mol) was reacted with 3,5-diaminobenzoic Acid (DABA, purchased from Acros Organics) (270.74 g, 1.78 mol), and 2,4,6-trimethyl-1,3-phenylenediamine (TMPA, 182.82 g, 1.22 mol) in 7200 g of N-methylpyrrolidone (NMP, electronic grade, purchased from Mallinkroft) and 1210.8 g of xylenes. The polymerization temperature was maintained between 170-178 degrees C. for 20.5 hours. Some of the polymer was precipitated into water/methanol mixture and polymer was collected by filtration, and dried under vacuum at 100 degrees C. overnight. GPC indicated the polymer has a weight average molecular weight of 172,650. DSC indicated that no glass transition temperature was detected up to 475 degrees C. where polymer decomposition occurred.

Preparation of Films and Testing

Preparation of Solution

Polymers P3, P6 and P7 were prepared as 15-25% solutions in NMP in 4 oz glass bottles by rolling the solutions on a roller mill.

Films F1, F2, F3 and P13 Control films were prepared as following: 3.09 g of polymer P13 was dissolved in 10.55 g of 2-pentanone (purchased from Aldrich) in a 4 oz glass bottle. The bottle was placed on a roller mill and rolled overnight to obtain a homogenous solution. To the solution was added the desired amount of additive oxalic acid (purchased from Aldrich) or malonic acid (purchased from Aldrich). And the mixture was rolled overnight on a roller mill. The formulation was listed in Table 2.

TABLE 2

List of film formulations from polymer P13

| Formulation | Malonic acid (g) | Oxalic acid (g) |
|---|---|---|
| P13 Control | 0 | 0 |
| F1 | 0.15 | 0 |
| F2 | 0.60 | 0 |
| F3 | 0 | 0.15 |
| F4 | 0 | 0.6 |

Preparation of Films

An 8 in.×8 in. glass plate was cleaned by sonicating in soapy DI water for at least 10 minutes, and rinsed with DI water. After drying in air, the glass plate was rinsed and wiped with acetone and then heptane using cleanroom wipes and allowed to air dry.

About 2 g of solution was poured on the glass plate in a line and drawn down using a 20 mil drawdown bar. The wet coating was placed in a $N_2$ purge box at room temperature to limit the exposure to humidity and covered with another glass plate to slow solvent evolution using a ½ in. spacer. After overnight, the glass plate and coating was removed from nitrogen purge box and placed in DI water. The coating separated from the glass plate in a few minutes as a flexible coating and was allowed the film to air dry.

The films F1, F2, F3, and P13 Control film were then dried under vacuum at 100 degrees C. overnight. Films P3 and P6 were dried under vacuum at 200 degrees C. for 1 hour, and film P7 was dried under vacuum at 250 degrees C. for 1 hour. These films are labeled as P3 Control, P6 Control, and P7 Control in Table 3.

Thermal treatment to remove porogen was carried out by curing the film in a box furnace. The film was placed between two porous alumina plates. For films F1, F2, F3, and P13 Control film the thermal curing program for thermal treatment is as following: hold at 30° C. for 30 minutes with about 1 LPM house $N_2$ flow throughout, ramp to 100° C. at 5° C./minute, ramp to 250° C. in 110 minutes, then hold for 2 hours. The films were thermally cured after vacuum drying at 100 degrees C. overnight.

For films P3, P6 and P7, the air dried films were thermally cured at 350 degrees C. for 1 hour. DSC analysis of P3, P6 and P7 indicated that there was no evident glass transition temperature up to 400 degrees C. The thermal curing program is as following: hold at 30° C. for 30 minutes with about 1 LPM house $N_2$ flow throughout, ramp to 350° C. at 5° C./minute, then hold for 1 hour. After cooling to room temperature, the film was evaluated for gas permeation.

Gas Permeation Testing

Permeation coefficients were measured on a Dow Cell permeation unit. The apparatus is used to evaluate the permeability of polymer film to pure gases. A polymer film is sealed by a viton o-ring into a brass or SS cell. The film forms a semi-permeable barrier between two components in the cell. During the experiment, a slow purge of test gas is passed across the upper surface of the film and vented thru a silicone oil-filled bubbler. The opposite film surface and cell compartment is initially under vacuum. The permeability of the gas is determined by measuring the pressure rise in the second compartment as a function of time, generally up to 3 torr. The measurement is performed until repeatable permeation values are achieved. Historical data indicate that permeation coefficients are accurate to within 10% of the value. The test results are listed in Table 4.

TABLE 3

Permeation testing results

| Film | $P(CO_2)$ | $P(CH_4)$ | Alpha ($CO_2/CH_4$) |
|---|---|---|---|
| P3 Control | 8.4 | 0.2 | 42.0 |
| P3 Control | 7.7 | 0.2 | 38.5 |
| P3 Control average | 8.6 | 0.2 | 40.3 |
| P3 | 130.5 | 2.3 | 56.7 |
| P3 | 224.4 | 4.5 | 49.9 |
| P3 average | 176.5 | 3.4 | 53.3 |
| P6 Control | 14.8 | 0.3 | 54.8 |
| P6 Control | 18.6 | 0.4 | 45.8 |
| P6 Control average | 16.7 | 0.35 | 50.3 |
| P6 | 125.1 | 1.8 | 69.9 |
| P6 | 114.0 | 1.6 | 69.6 |
| P6 average | 119.6 | 1.7 | 69.8 |
| P7 Control | 36.1 | 1.1 | 32.8 |
| P7 Control | 40.8 | 1.0 | 40.8 |
| P7 Control average | 38.5 | 1.05 | 36.8 |
| P7 | 107 | 2.0 | 53.5 |

TABLE 4

Permeation Testing Results

| Film | $P(CO_2)$ | $P(CH_4)$ | Alpha ($CO_2/CH_4$) |
|---|---|---|---|
| P13 Control | 74.2 | 1.69 | 43.9 |
| P13 control | 123.7 | 2.78 | 44.5 |
| P13 Control average | 99.0 | 2.24 | 44.2 |
| F1 | 130.3 | 2.76 | 47.2 |
| F1 | 152.6 | 3.22 | 47.4 |
| F1 average | 141.4 | 2.99 | 47.3 |
| F3 | 99.7 | 2.75 | 36.3 |
| F3 | 127.1 | 2.80 | 45.4 |
| F3 average | 113.4 | 2.78 | 40.9 |
| F4 | 111.1 | 2.56 | 43.4 |
| F4 | 120.1 | 2.71 | 44.3 |
| F4 average | 115.6 | 2.64 | 43.9 |

EXPLANATION OF THE FIGURES

Malonic acid and oxalic acid are known to thermally degrade cleanly to release $CO_2$. FIG. 3 indicated that there was residual solvent in the film and volatilized before 250° C. FIG. 5 indicated the thermal degradation of malonic acid in film F1 at 159° C. Similarly, FIG. 7 indicated the thermal degradation of oxalic acid in film F3 at 176° C.

Figure 1:
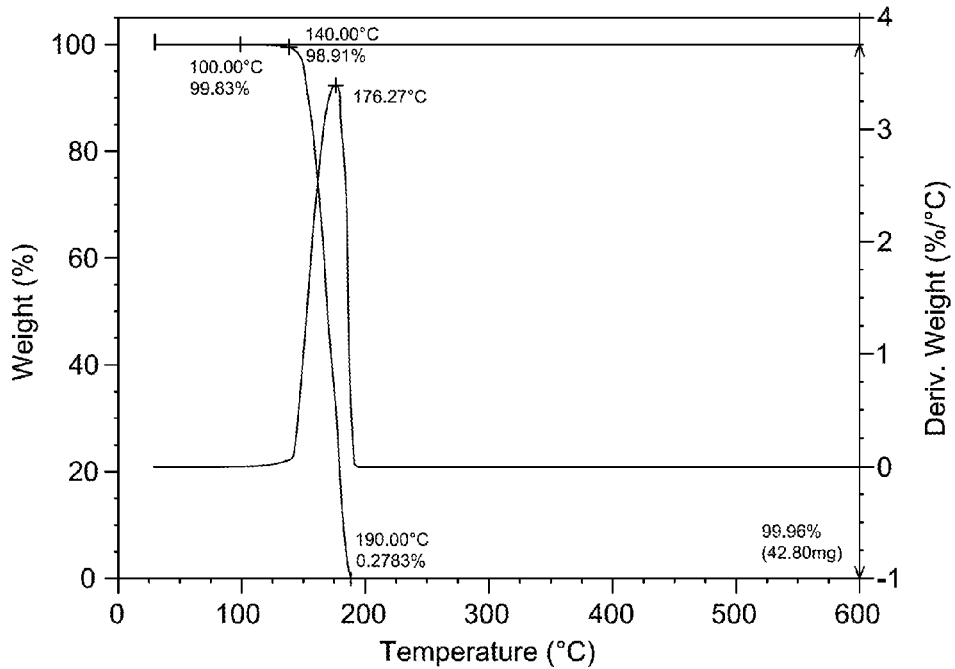
FIG. 1 illustrates the thermal degradation of malonic acid. Malonic acid started to degrade at 140° C. and completely decomposed by 190° C. Similarly.
Figure 2:
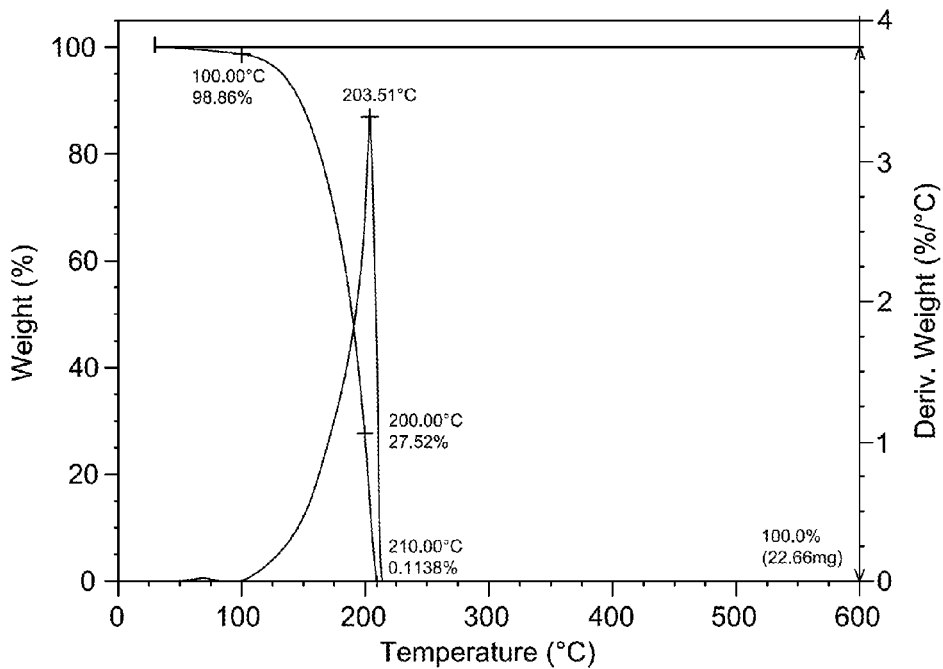
FIG. 2 illustrates the thermal degradation of oxalic acid. Oxalic acid thermally degraded by 210° C.
Figure 3:
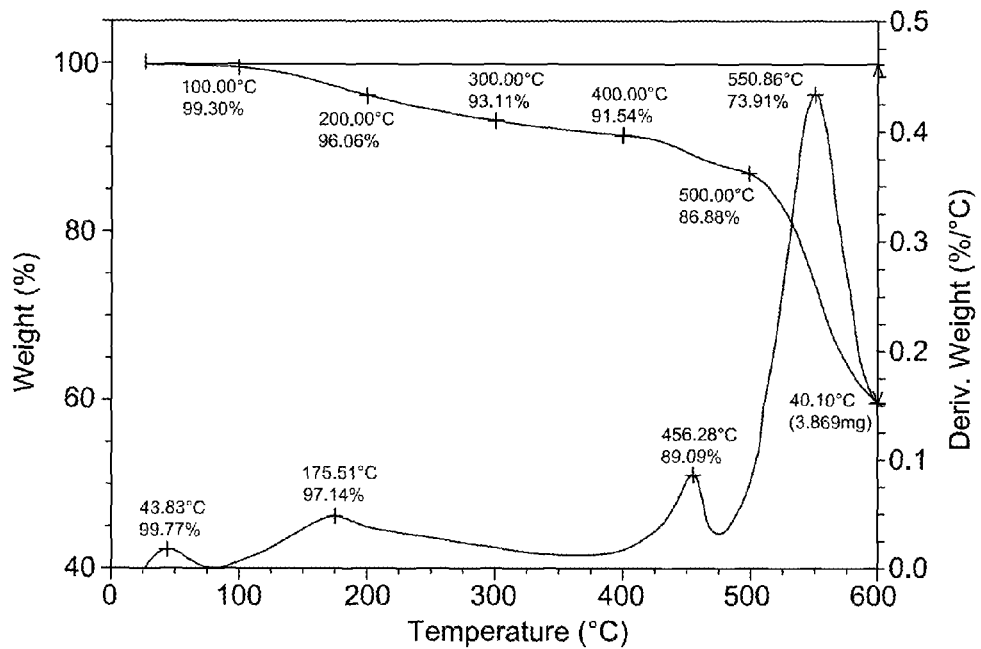
FIGS. 3, 5 and 7 illustrate the TGA of the control film, film F1 and film F3 after they were vacuum dried at 100° C. This drying temperature is below the thermal degradation temperature of polymer P13, malonic acid and oxalic acid.
Figure 4:
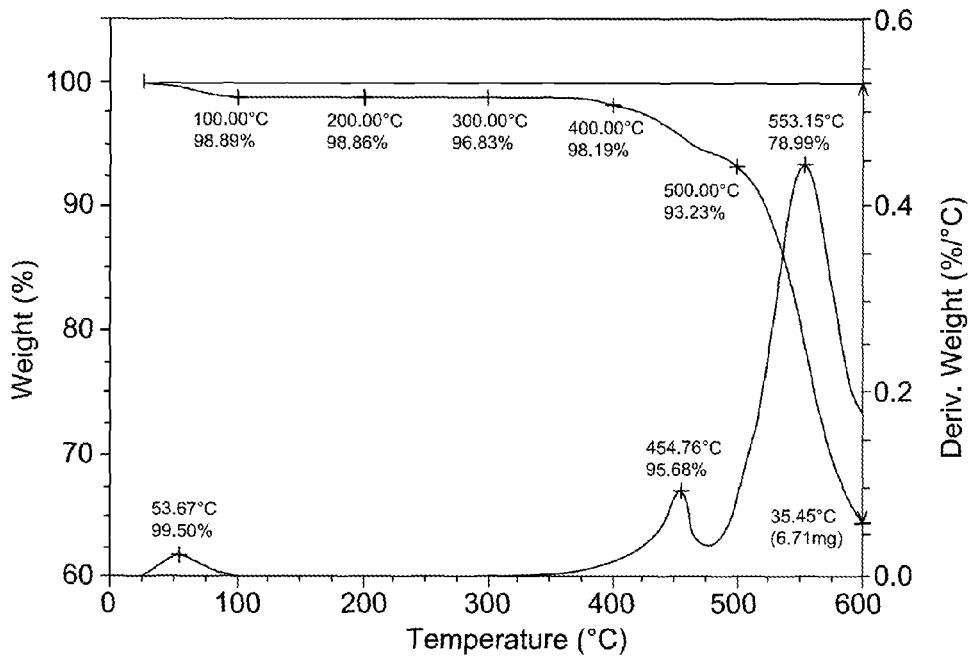
FIGS. 4, 6, and 8 illustrate the TGA of the control film, film F1 and film F3 after thermal treatment at 250° C. for 2 hours. After thermal treatment at 250° C., malonic acid and oxalic acid in film F1 and F3 thermally degraded. The figures clearly indicated that after thermal treatment at 250° C., all films showed no further thermal decomposition up to 375° C.
Figure 5:
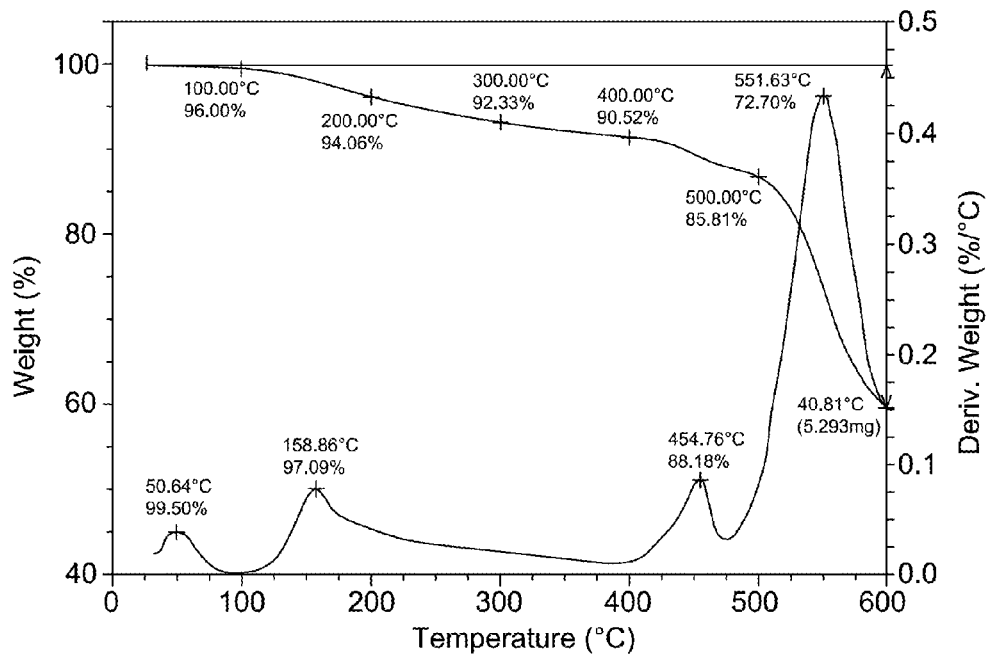
Figure 6:
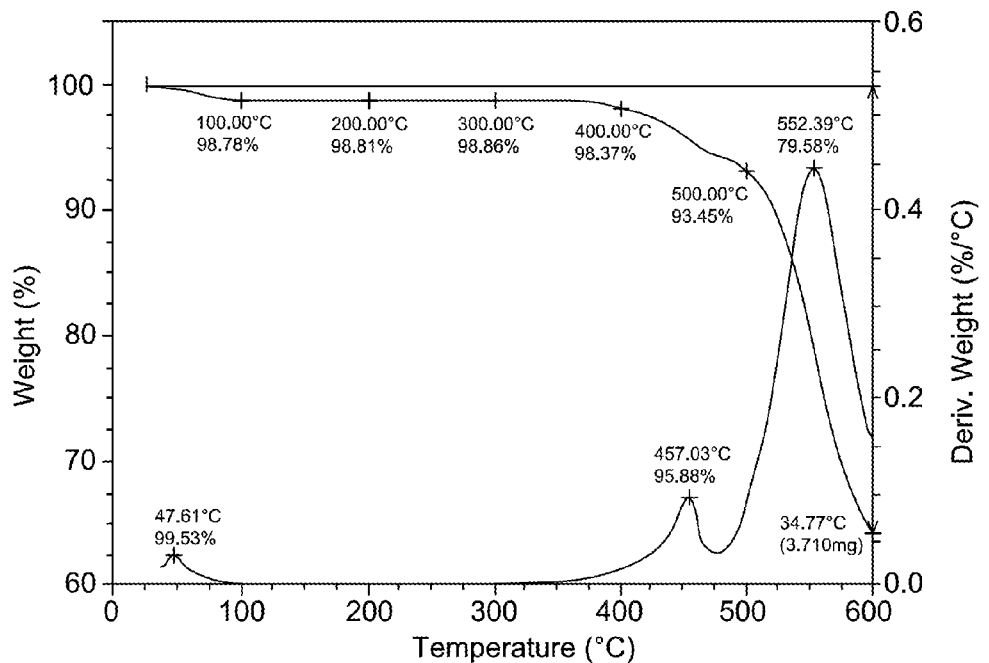
Figure 7:
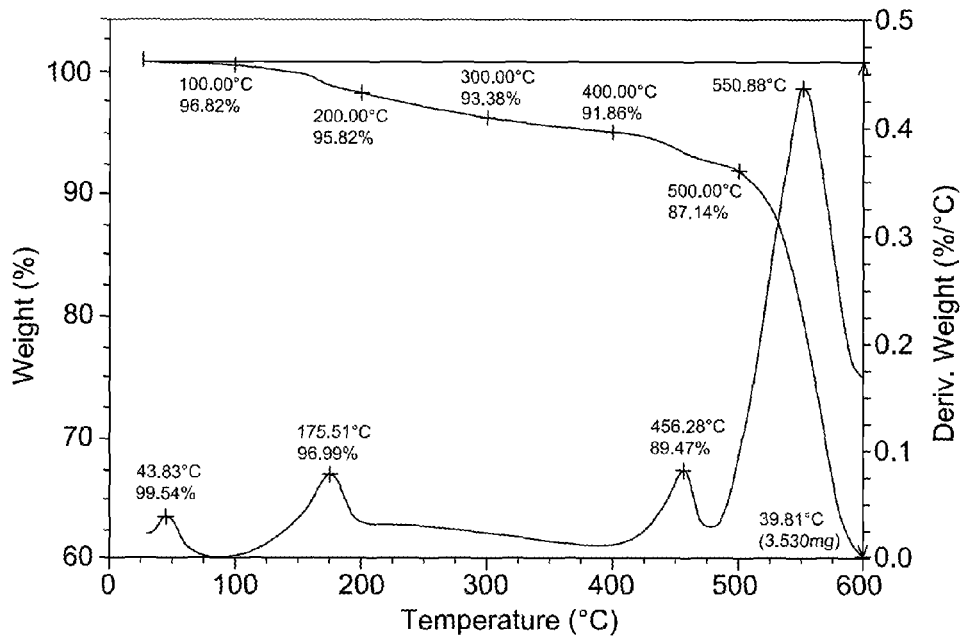
Figure 8:
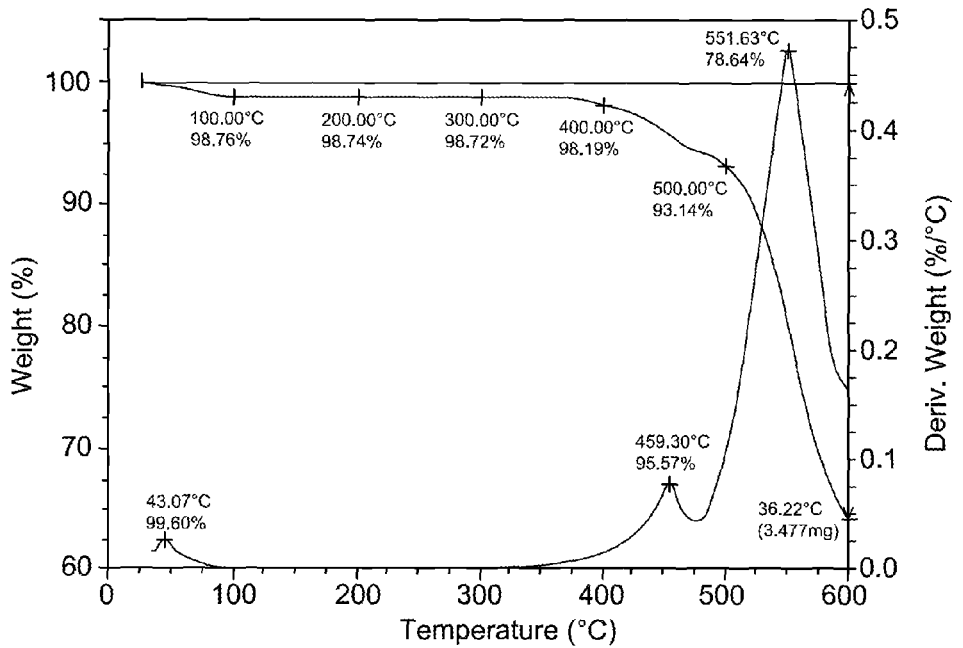

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims.

Such variations are not regarded as a departure from the spirit and scope of the invention, and all such variations are intended to be included within the scope of the following claims.

What is claimed is:

1. A method for preparing a polymeric material, said method comprising:
providing a polymeric matrix comprising at least one polymer and at least one porogen; and
forming the polymeric material by degrading the at least one porogen at a temperature T less than or equal to $T_g$, where $T_g$ is a glass transition temperature of the polymeric matrix, said degrading step comprising exposing the polymeric matrix to at least one treatment selected from the group consisting of thermal degradation, chemical degradation, electrical degradation, and radiation degradation,
wherein the polymeric material has a permeability at least 1.2 times a permeability of the polymeric matrix for a gas, and a selectivity of the polymeric material for a gas pair is at least 0.35 times a selectivity of the polymeric matrix for the gas pair.

2. The method of claim 1, wherein polymer backbone structures of the polymeric matrix are not changed.

3. The method of claim 1, wherein the gas pair is selected from the group consisting of $O_2/N_2$, $CO_2/CH_4$, $CO_2/N_2$, $H_2/N_2$, $He/N_2$, $H_2/CH_4$, $He/CH_4$, $He/H_2$, $H_2/CO_2$, $H_2O$/at least one other gas, and $He/CO_2$.

4. The method of claim 1, wherein the permeability of the polymeric material is at least 5 times the permeability of the polymeric matrix for the gas, and the selectivity of the polymeric material is at least 0.35 times the selectivity of the polymeric matrix for the gas pair.

5. The method of claim 4, wherein the gas pair is selected from the group consisting of $O_2/N_2$, $CO_2/CH_4$, $CO_2/N_2$, $H_2/N_2$, $He/N_2$, $H_2/CH_4$, $He/CH_4$, $He/H_2$, $H_2/CO_2$, $H_2O$/at least one other gas, and $He/CO_2$.

6. A method for preparing a polymeric material, said method comprising:
providing a polymeric matrix comprising at least one polymer and at least one porogen; and
forming the polymeric material by degrading the at least one porogen at a temperature T less than or equal to $T_g$, where $T_g$ is a glass transition temperature of the polymeric matrix, said degrading step comprising exposing the polymeric matrix to at least one treatment selected from the group consisting of thermal degradation, chemical degradation, electrical degradation, and radiation degradation,
wherein the polymeric material is a gas separation membrane, which exceeds Robeson's upper bound relationship for at least one gas separation pair selected from the group consisting of $O_2/N_2$, $CO_2/CH_4$, $CO_2/N_2$, $H_2/N_2$, $He/N_2$, $H_2/CH_4$, $He/CH_4$, $He/H_2$, $H_2/CO_2$, $H_2O$/at least one other gas, and $He/CO_2$.

7. The method of claim 1, wherein the at least one polymer is at least one member selected from the group consisting of polyamides, polyimides, polyetherimides, polyethersulfones, polysulfones, polybenzimidazoles, polybenzobenzimidazoles, poly(aryl ether ketones), poly(aryl ethers), aromatic polyarylates, aromatic polycarbonates, poly(benzoxazoles), poly(amide-imides), poly(oxadiazole-imides), poly(etherimides), poly(aryl sulfides), polybenzothiazoles, polypyrrolones, polyoxadiazoles, polytriazoles, polyesterimides, poly(phenyl quinoxaline) and poly(phenylenes), and copolymers and combinations thereof.

8. The method of claim 1, wherein the at least one polymer has a glass transition temperature higher than 100° C.

9. The method of claim 1, wherein the at least one polymer has an average molecular weight of 10,000 to 400,000.

10. The method of any preceding claim, wherein the at least one polymer and the at least one porogen are represented by structure I or II:

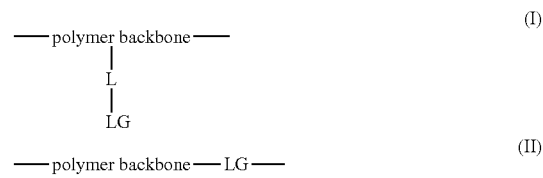

wherein LG is a labile group porogen that degrades upon exposure to the at least one treatment to yield products that diffuse out of the polymeric matrix, and L is a direct bond between LG and the polymer backbone or a carbon linking group having 1 to 40 carbon atoms or a non-carbon linking group having 0 to 40 carbon atoms.

11. The method of claim 10, wherein L is a linking group comprising an alkyl, alkenyl, alkynyl, aryl, or heteroaryl group and optionally O, N, S, F, Cl, Br or Si atoms.

12. The method of claim 10, wherein LG is a member selected from the group consisting of aliphatic hydrocarbon groups, ester groups, thioester groups, aliphatic ether groups, aliphatic carbonate groups, halogen groups, aliphatic and aromatic sulfonate, aliphatic and aromatic phosphonates, bisulfide groups, azo groups, blocked isocyanate groups, carboxylate, Diels-Alder adducts, organoonium, quaternized ammonium, N-alkylated heteroaryl groups, thiosulfate groups and mixtures thereof.

13. The method of claim 1, wherein the at least one polymer is a polyimide and the porogen is not carboxylic acid or sulfonic acid.

14. The method of claim 1, wherein the at least one porogen is an additive miscible in the polymeric matrix.

15. The method of claim 14, wherein the at least one porogen is at least one member selected from the group consisting of aliphatic hydrocarbons, aliphatic carboxylic acids and esters, aliphatic ethers and thioethers, aliphatic carbonates, aromatic carboxylic acids and esters, aromatic carbonates, crown ethers, calixarenes, cyclic structures of aromatic linked groups with labile linking groups, cyclic structures of polyesters, blocked isocyanates, alphatic and aromatic thiosulfates, bisulfide compounds, organoonium compounds, Diels-Alder adducts, azo compounds, photo acid generators, sulfur, organic sulfonic acids and sulfates, organic sulfites, alpha-terpinene, d-limonene, rosin, abetic acid esters and mixtures thereof.

16. The method of claim 14, wherein the at least one porogen is a small molecule, an oligomer, or a polymer.

17. The method of claim 14, wherein the at least one porogen is an aliphatic carboxylic acid or an azo compound.

18. The method of claim 14, wherein the at least one polymer is a polyimide or polysulfone.

19. The method of claim 14, wherein the at least one porogen is 1 to 40 weight percent of the at least one polymer.

20. The method of claim 1, wherein T is less than $T_g$.

21. The method of claim 1, wherein the polymeric matrix is crosslinked prior to the degrading step, so as to hinder a relaxation process for the polymer and hinder free volume loss.

22. The method of claim 1, wherein the polymeric matrix is crosslinked during the degrading step.

23. The method of claim 1, further comprising inducing phase inversion of the polymeric matrix to provide the polymeric material in a form of an asymmetric membrane.

24. A polymeric material prepared by the method of claim 1, which is adapted for use as a gas separation membrane.

25. A gas separation membrane comprising the polymeric material prepared by the method of claim 1.

26. The membrane of claim 25, wherein the gas pair is selected from the group consisting of $O_2/N_2$, $CO_2/CH_4$, $CO_2/N_2$, $H_2/N_2$, $He/N_2$, $H_2/CH_4$, $He/CH_4$, $He/H_2$, $H_2/CO_2$, $H_2O$/at least one other gas, and $He/CO_2$.

27. The membrane of claim 23, wherein the permeability of the polymeric material is at least 5 times the permeability of the polymeric matrix for the gas, and the selectivity of the polymeric material is at least 0.35 times the selectivity of the polymeric matrix for the gas pair.

28. The membrane of claim 27 wherein the gas pair is selected from the group consisting of $O_2/N_2$, $CO_2/CH_4$, $CO_2/N_2$, $H_2/N_2$, $He/N_2$, $H_2/CH_4$, $He/CH_4$, $He/H_2$, $H_2/CO_2$, $H_2O$/at least one other gas, and $He/CO_2$.

29. The membrane of claim 25, which exceeds Robeson's upper bound relationship for at least one gas separation pair selected from the group consisting of $O_2/N_2$, $CO_2/CH_4$, $CO_2/N_2$, $H_2/N_2$, $He/N_2$, $H_2/CH_4$, $He/CH_4$, $He/H_2$, $H_2/CO_2$, $H_2O$/at least one other gas, and $He/CO_2$.

30. The membrane of claim 25, wherein the at least one polymer is at least one member selected from the group consisting of polyamides, polyimides, polyetherimides, polyethersulfones, polysulfones, polybenzimidazoles, polybenzobenzimidazoles, poly(aryl ether ketones), poly(aryl ethers), aromatic polyarylates, aromatic polycarbonates, poly(benzoxazoles), poly(amide-imides), poly(oxadiazole-imides), poly(etherimides), poly(aryl sulfides), polybenzothiazoles, polypyrrolones, polyoxadiazoles, polytriazoles, polyesterimides, poly(phenyl quinoxaline) and poly(phenylenes), and copolymers and combinations thereof.

31. The membrane of claim 25, wherein the at least one polymer has a glass transition temperature higher than 100° C.

32. The membrane of claim 25, wherein the at least one polymer has an average molecular weight of 10,000 to 400,000.

33. The membrane of claim 25, wherein the at least one polymer and the at least one porogen are represented by structure I or II:

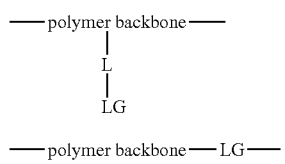

wherein LG is a labile group porogen that degrades upon exposure to the at least one treatment to yield products that diffuse out of the polymeric matrix, and L is a direct bond between LG and the polymer backbone or a carbon linking group having 1 to 40 carbon atoms or a non-carbon linking group having 0 to 40 carbon atoms.

34. The membrane of claim 33, wherein L is a linking group comprising an alkyl, alkenyl, alkynyl, aryl, or heteroaryl group and optionally O, N, S, F, Cl, Br or Si atoms.

35. The membrane of claim 33, wherein LG is a member selected from the group consisting of aliphatic hydrocarbon groups, ester groups, thioester groups, aliphatic ether groups, aliphatic carbonate groups, halogen groups, aliphatic and aromatic sulfonate, aliphatic and aromatic phosphonates, bisulfide groups, azo groups, blocked isocyanate groups, carboxylate, Diels-Alder adducts, organoonium, quaternized ammonium, N-alkylated heteroaryl groups, thiosulfate groups and mixtures thereof.

36. The membrane of claim 25, wherein the at least one porogen is an additive miscible in the polymeric matrix.

37. The membrane of claim 36, wherein the at least one porogen is at least one member selected from the group consisting of aliphatic hydrocarbons, aliphatic carboxylic acids and esters, aliphatic thioethers and ethers, aliphatic carbonates, aromatic carboxylic acid and esters, aromatic carbonates, crown ethers, calixarenes, cyclic structures of aromatic linked groups with labile linking groups, cyclic structures of polyesters, blocked isocyanates, alphatic and aromatic thiosulfates, bisulfide compounds, organoonium compounds, Diels-Alder adducts, azo compounds, blowing agents, photo acid generators, sulfur, organic sulfonic acids and sulfates, organic sulfites, alpha-terpinene, d-limonene, rosin, abietic acid esters and mixture thereof.

38. The membrane of claim 25, wherein T is less than $T_g$.

39. The membrane of claim 25, wherein the polymeric matrix is crosslinked prior to the degrading step, so as to hinder a relaxation process for the polymer and hinder free volume loss.

40. The membrane of claim 23, wherein the polymeric matrix is crosslinked during the degrading step.

41. The membrane of claim 25, which is asymmetric and comprises hollow fibers.

42. The membrane of claim 25, wherein the at least one polymer is a polyimide and the porogen is not carboxylic acid or sulfonic acid.

43. A method for separating components of a fluid, said method comprising:
    providing a separation device comprising a polymeric material of claim 1 as a separation membrane;
    feeding a feed fluid to the separation device, wherein the feed fluid comprises a mixture of a first fluid and at least one second fluid; and
    collecting a product from the separation device, wherein the product contains the first fluid at a higher purity than the feed fluid.

44. The method of claim 43, wherein the feed fluid comprises a gas pair selected from the group consisting of $O_2/N_2$, $CO_2/CH_4$, $CO_2/N_2$, $H_2/N_2$, $He/N_2$, $H_2/CH_4$, $He/CH_4$, $He/H_2$, $H_2/CO_2$, $H_2O$/at least one other gas, and $He/CO_2$.

* * * * *